United States Patent
Feng et al.

(10) Patent No.: US 11,334,819 B2
(45) Date of Patent: *May 17, 2022

(54) METHOD AND SYSTEM FOR DISTRIBUTED MACHINE LEARNING

(71) Applicant: VERIZON PATENT AND LICENSING INC., Basking Ridge, NJ (US)

(72) Inventors: Andrew Feng, Cupertino, CA (US); Erik Ordentlich, San Jose, CA (US); Lee Yang, Campbell, CA (US); Peter Cnudde, Los Altos, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 62 days.

This patent is subject to a terminal disclaimer.

(21) Appl. No.: 17/005,592

(22) Filed: Aug. 28, 2020

(65) Prior Publication Data

US 2021/0049507 A1 Feb. 18, 2021

Related U.S. Application Data

(63) Continuation of application No. 15/098,415, filed on Apr. 14, 2016, now Pat. No. 10,789,545.

(51) Int. Cl.
*G06F 16/30* (2019.01)
*G06N 20/00* (2019.01)
*H04L 67/10* (2022.01)

(52) U.S. Cl.
CPC ............ *G06N 20/00* (2019.01); *H04L 67/10* (2013.01)

(58) Field of Classification Search
CPC ..... G06F 16/22; G06F 16/285; G06F 16/9566
USPC ........ 707/609, 687, 705, 769, 790, 813, 821
See application file for complete search history.

(56) References Cited

U.S. PATENT DOCUMENTS

| | | | |
|---|---|---|---|
| 9,165,124 B1* | 10/2015 | Gurevich | G06F 16/9566 |
| 2015/0019204 A1* | 1/2015 | Simard | G06F 40/30 |
| | | | 704/9 |
| 2016/0065534 A1* | 3/2016 | Liu | H04L 61/1511 |
| | | | 707/728 |
| 2017/0083508 A1* | 3/2017 | Dixon | G06F 40/58 |
| 2017/0161279 A1* | 6/2017 | Franceschini | G06N 5/02 |

* cited by examiner

*Primary Examiner* — Sana A Al-Hashemi

(57) ABSTRACT

The present teaching relates to estimating one or more parameters on a system including a plurality of nodes. In one example, the system comprises: one or more learner nodes, each of which is configured for generating information related to a group of words for estimating the one or more parameters associated with a machine learning model; and a plurality of server nodes, each of which is configured for obtaining a plurality of sub-vectors each of which is a portion of a vector that represents a word in the group of words, updating the sub-vectors based at least partially on the information to generate a plurality of updated sub-vectors, and estimating at least one of the one or more parameters associated with the machine learning model based on the plurality of updated sub-vectors.

20 Claims, 16 Drawing Sheets

METHOD AND SYSTEM FOR DISTRIBUTED MACHINE LEARNING

CROSS-REFERENCE TO RELATED APPLICATION

The present application is a continuation of U.S. patent application Ser. No. 15/098,415, filed Apr. 14, 2016, which is incorporated herein by reference in its entirety.

BACKGROUND

1. Technical Field

The present teaching relates to methods, systems, and programming for distributed computing. Particularly, the present teaching is directed to methods, systems, and programming for distributed machine learning on a cluster.

2. Discussion of Technical Background

Embedding words in a vector space can help a learning algorithm to achieve better performance in natural language processing. Word2Vec is a popular algorithm to learn vector representations of words from their contexts in large corpuses. The learned vectors can encode many linguistic regularities and patterns, which could be represented as linear translations, such as vec("Madrid")−vec("Spain")+vec("France")≈vec("Paris").

Many new applications of Word2Vec nowadays require Word2Vec be able to handle much larger vocabularies of words. The existing Word2Vec implementations, however, require vectors of all vocabulary words to be stored in the memory of a single server, or suffer unacceptable training latency due to massive network data transfer. With the memory capacity of a standard server today, it may take several weeks to train vectors for some Word2Vec applications having large training datasets, which will result in outdated vectors. As such, existing Word2Vec solutions are not scalable as the vocabulary size becomes very large.

Therefore, there is a need to develop techniques for an improved Word2Vec solution to overcome the above drawbacks.

SUMMARY

The present teaching relates to methods, systems, and programming for distributed computing. Particularly, the present teaching is directed to methods, systems, and programming for distributed machine learning on a cluster.

In one example, a system including a plurality of nodes, each of which has at least one processor, storage, and a communication platform connected to a network for estimating one or more parameters on the plurality of nodes, is disclosed. The system comprises: one or more learner nodes, each of which is configured for generating information related to a group of words for estimating the one or more parameters associated with a machine learning model; and a plurality of server nodes, each of which is configured for obtaining a plurality of sub-vectors each of which is a portion of a vector that represents a word in the group of words, updating the sub-vectors based at least partially on the information to generate a plurality of updated sub-vectors, and estimating at least one of the one or more parameters associated with the machine learning model based on the plurality of updated sub-vectors.

In another example, a method, implemented on a machine having at least one processor, storage, and a communication platform capable of connecting to a network for estimating one or more parameters on a node in a cluster of distributed nodes, is disclosed. Information related to a group of words is received at the node for estimating the one or more parameters associated with a machine learning model. A plurality of sub-vectors is obtained at the node. Each of the plurality of sub-vectors is a portion of a vector that represents a word in the group of words. The vector includes one or more additional sub-vectors each of which is allocated to one of other nodes in the cluster. The plurality of sub-vectors is updated at the node based at least partially on the information to generate a plurality of updated sub-vectors. At least one of the one or more parameters of the machine learning model is estimated at the node based on the plurality of updated sub-vectors.

In yet another example, an apparatus, implemented on a node in a cluster, having at least one processor, storage, and a communication platform connected to a network for estimating one or more parameters on a node in a cluster of distributed nodes, is disclosed. The apparatus comprises: a remote procedure call analyzer configured for receiving information related to a group of words for estimating the one or more parameters associated with a machine learning model; a word vector retriever configured for obtaining a plurality of sub-vectors each of which is a portion of a vector that represents a word in the group of words, wherein the vector includes one or more additional sub-vectors each of which is allocated to one of other nodes in the cluster; and a word vector updater configured for updating the plurality of sub-vectors based at least partially on the information to generate a plurality of updated sub-vectors and estimating at least one of the one or more parameters of the machine learning model based on the plurality of updated sub-vectors.

Other concepts relate to software for implementing the present teaching on distributed machine learning. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having data recorded thereon for estimating one or more parameters on a node in a cluster of distributed nodes is disclosed. The medium, when read by the machine, causes the machine to perform the following: receiving, at the node, information related to a group of words for estimating the one or more parameters associated with a machine learning model; obtaining, at the node, a plurality of sub-vectors each of which is a portion of a vector that represents a word in the group of words, wherein the vector includes one or more additional sub-vectors each of which is allocated to one of other nodes in the cluster; updating, at the node, the plurality of sub-vectors based at least partially on the information to generate a plurality of updated sub-vectors; and estimating, at the node, at least one of the one or more parameters of the machine learning model based on the plurality of updated sub-vectors.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
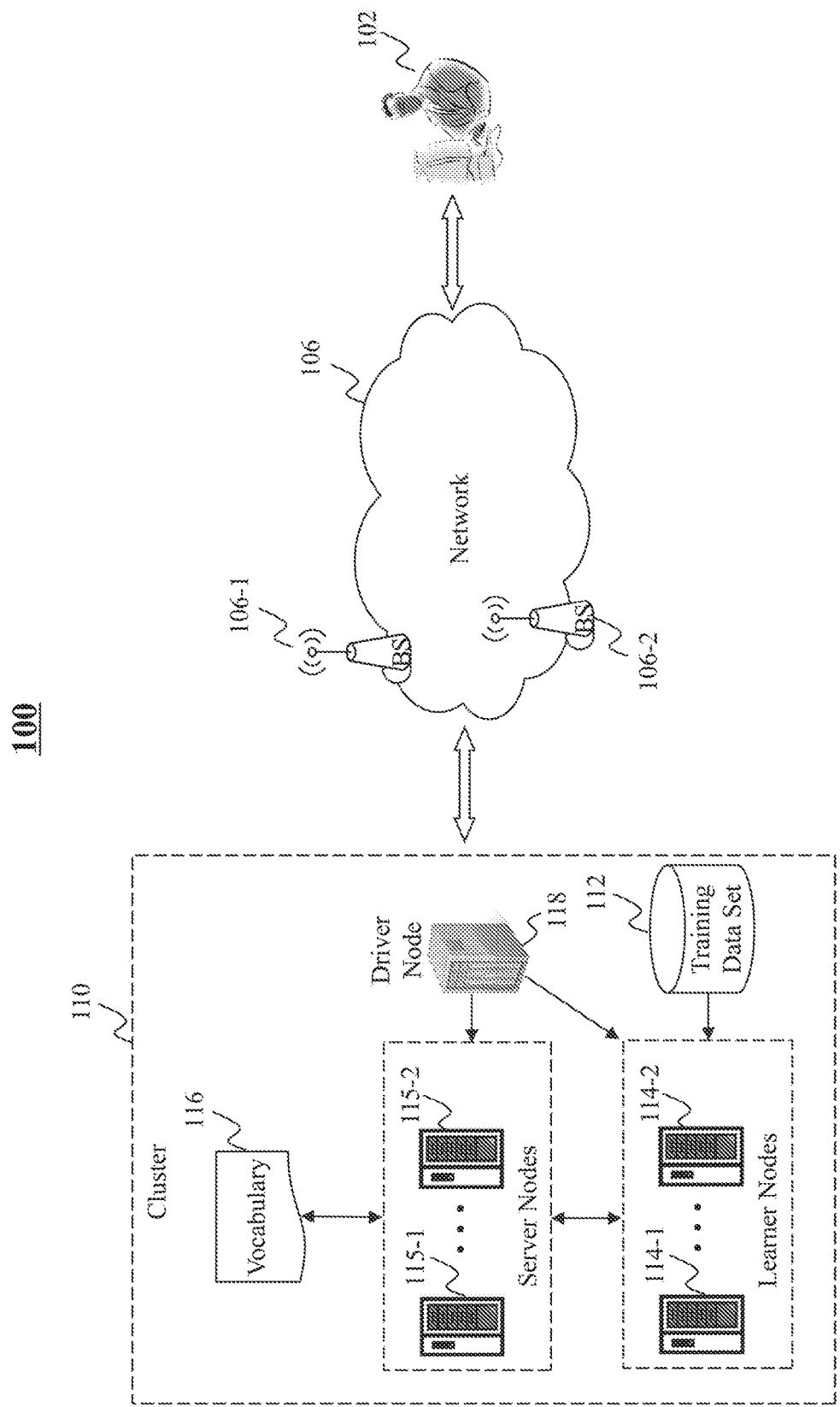
FIG. 1 is a high level depiction of an exemplary networked environment for distributed Word2Vec training on a cluster, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of distributed machine learning on a cluster. The method and system as disclosed herein aim at performing distributed learning to train a machine learning mode, e.g. Word2Vec, in an efficient manner, even when the vocabulary size is very large.

The present teaching introduces a truly scalable Word2Vec solution that enables high dimensional vectors for hundreds of millions of vocabulary words to be trained within practical durations. The present teaching also discloses a novel application of locality-sensitive hashing for computing top-k nearest words in terms of cosine distances of their vectors, based on vectors trained with the Word2Vec solution. The solution in the present can be adopted for query-to-ads matching in sponsored search to increase ad coverage and revenue. The present teaching also discloses a work-flow that enables continuous vector update through incremental Word2Vec training.

Innovative applications require that Word2Vec be able to handle much larger vocabularies of words (e.g., 200 million vocabulary size for sponsored search). In Word2Vec, each vocabulary word will have one input vector and one output vector, each of which may be an array of d float numbers. All these vectors need to be kept in memory. To train vocabulary words V, Word2Vec requires |V|*2*d*4 bytes of memory. A 200 million sponsored search use case requires 200M*2*300*4=480 GB memory. This is beyond the memory capacity of a standard production server today. These Word2Vec applications also have much larger training datasets, which could take several weeks to train vectors, resulting in outdated vectors. Therefore, the present teaching introduces distributed Word2Vec training on a cluster.

Distributed computing is a field of computer science that studies distributed systems, which include multiple autonomous computers or parallel virtual machines that communicate through a computer network, such as a computer cluster having multiple nodes. The present teaching describes a scalable Word2Vec system and method that can achieve the following objectives: to enable very large vocabulary size using a cluster of servers, to speed up vector training to reduce end-to-end times, and to enable daily training. This is the first Word2Vec implementation in the industry that is truly scalable.

The distributed Word2Vec solution in the present teaching can enable many applications to efficiently learn vectors for relevant "words" nearly independently of vocabulary size.

In accordance with one embodiment of the present teaching, distributed Word2Vec training can be implemented on a system including a plurality of nodes. The system comprises a driver node, one or more learner nodes, and a plurality of server nodes. The driver node may set up a stage for training a machine learning model related to Word2Vec. For example, the driver node can obtain a plurality of vectors each of which represents a word in the vocabulary, and divide each vector into a plurality of sub-vectors. A learner node can generate information related to a group of words, based on training data, for training the Word2Vec model. Each server node may be allocated a sub-vector of each vector, and be responsible for updating the sub-vectors based at least partially on the information to generate a plurality of updated sub-vectors. As such, the vectors representing the words in the vocabulary can be updated periodically at the server nodes, without a need for the server nodes to communicate with each other.

In a system according to one embodiment, word vectors are partitioned column-wise among the server nodes, such that there is no transmission of word vectors or vector gradients across network during the training. In addition, to generate negative examples for training the Word2Vec model, a common random seed is broadcasted to distributed server nodes. As such, a server node does not need to store previously generated negative examples, but can regenerate the negative examples based on the same random seed. In addition, transmitting a random seed is more efficient than transmitting all of the indices of the negative examples themselves.

The terms "learning" and "machine learning" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for distributed training on a cluster, according to an embodiment of the present teaching. In FIG. 1, the exemplary networked environment 100 includes one or more users 102, a cluster 110, and a network 106. In this exemplary networked environment 100, a user 102, who may be a network administrator, operator, developer, or customer of the cluster 110, may send a request to the cluster 110 via the network 106 or via an internal or proprietary network connection (not shown) to start a distributed machine learning process and retrieve a result from the cluster 110. The term "machine learning process" referred herein may include any process that tunes a number of parameters to be simultaneously optimal on training dataset using one or more machines.

The network 106 may be a single network or a combination of different networks. For example, the network 106 may be a local area network (LAN), a wide area network (WAN), a public network, a private network, a proprietary network, a Public Telephone Switched Network (PSTN), the Internet, a wireless network, a virtual network, or any combination thereof. The network 106 may also include various network access points, e.g., wired or wireless access points such as base stations or Internet exchange points 106-1, . . . , 106-2, through which a data source may connect to the network in order to transmit information via the network.

The cluster 110 in which the distributed machine learning is performed includes a vocabulary 116 that may be stored on a disk or a distributed file system in the cluster, a training data set 112, a plurality of server nodes 115-1, . . . 115-2, a plurality of learner nodes 114-1, . . . 114-2, and at least one driver node 118 (e.g., a gateway node in a HADOOP cluster), which communicate through the network 106 or through an internal network (not shown). In this example, each node of the cluster 110 may be an autonomous physical machine, such as a server, a workstation, a desktop or laptop computer, a netbook, a tablet, a smart phone, a game console, a set-top box, or any other suitable machine. In another example, some or all of the nodes may be parallel virtual machines implemented by either software emulation or hardware virtualization. The cluster 110 may be a set of machines owned by one entity, e.g., an enterprise, and maintained as a server farm or server cluster where the servers are mounted on racks in a server room or data center. The cluster 110 may also be a collection of machines owned by different entities and that are physically separate from each other at a distance.

In this example, the cluster 110 may include a training data set 112 that stores one or more very large training data subsets, for example, each including trillions of features, billions of training samples, and millions of parameters, for distributed machine learning performed on the cluster 110. For example, training data may be recorded on a remote server (not shown) outside the cluster 110 and transmitted (e.g., copied) to the training data set 112 through the driver node 118 prior to the learning process starts. By the time of running the distributed machine learning process, the training data already reside on the cluster 110, for example, in the training data set 112 of the cluster 110, as shown in FIG. 1, or have been partitioned across the learner nodes 114-1, . . . 114-2 of the cluster 110. In one example, a preprocessing step may have been performed in a HADOOP cluster as a HADOOP job to split training data randomly across the learner nodes 114-1, . . . 114-2. The cluster 110 may act as both the data storage and the computational resource for achieving high data locality which in turn results in high performance.

In this example, the cluster 110 may include a vocabulary 116 that stores different words for a distributed training. The words in the vocabulary 116 may represent different content in different implementations. In one embodiment, some word may be a query term or an entire query submitted by a user; some word may be a query suggestion provided to a user; some word may represent a search result in a search result page; some word may represent an advertisement presented in a search result page. In that case, the size of the vocabulary 116 could be very large, as the vocabulary 116 may include all queries submitted some number of times by all users, all content items, including search results and advertisements, in all search result pages, from all search logs of a search engine in a time period. For such a large vocabulary size, it will take a long time, e.g. several months, to train a Word2Vec training for this vocabulary in a single server or machine. In practice, as a search engine may keep updating search logs and creating new search logs, such a slow training may not keep up with the influx of new data. Similarly, implementing Word2Vec training in a single server may not work for many implementations involving a large vocabulary. As such, the present teaching discloses distributed training that stores Word2Vec vectors in the memory of a cluster of servers.

A naive solution for distributed Word2Vec training may require each learner node to fetch some of the current vectors from the server nodes, and send the gradients or updated vectors back to the server nodes. For large models and training data sets, network overhead may prevent this solution from producing vectors in a timely fashion. The sponsored search use case, for example, would take over 2 months for training under this naive solution.

According to a method in the present teaching, each server node in the cluster may be allocated a sub-vector of each vector in the vocabulary, and be responsible for updating the these sub-vectors, which enables large size models to be trained efficiently.

Figure 2:
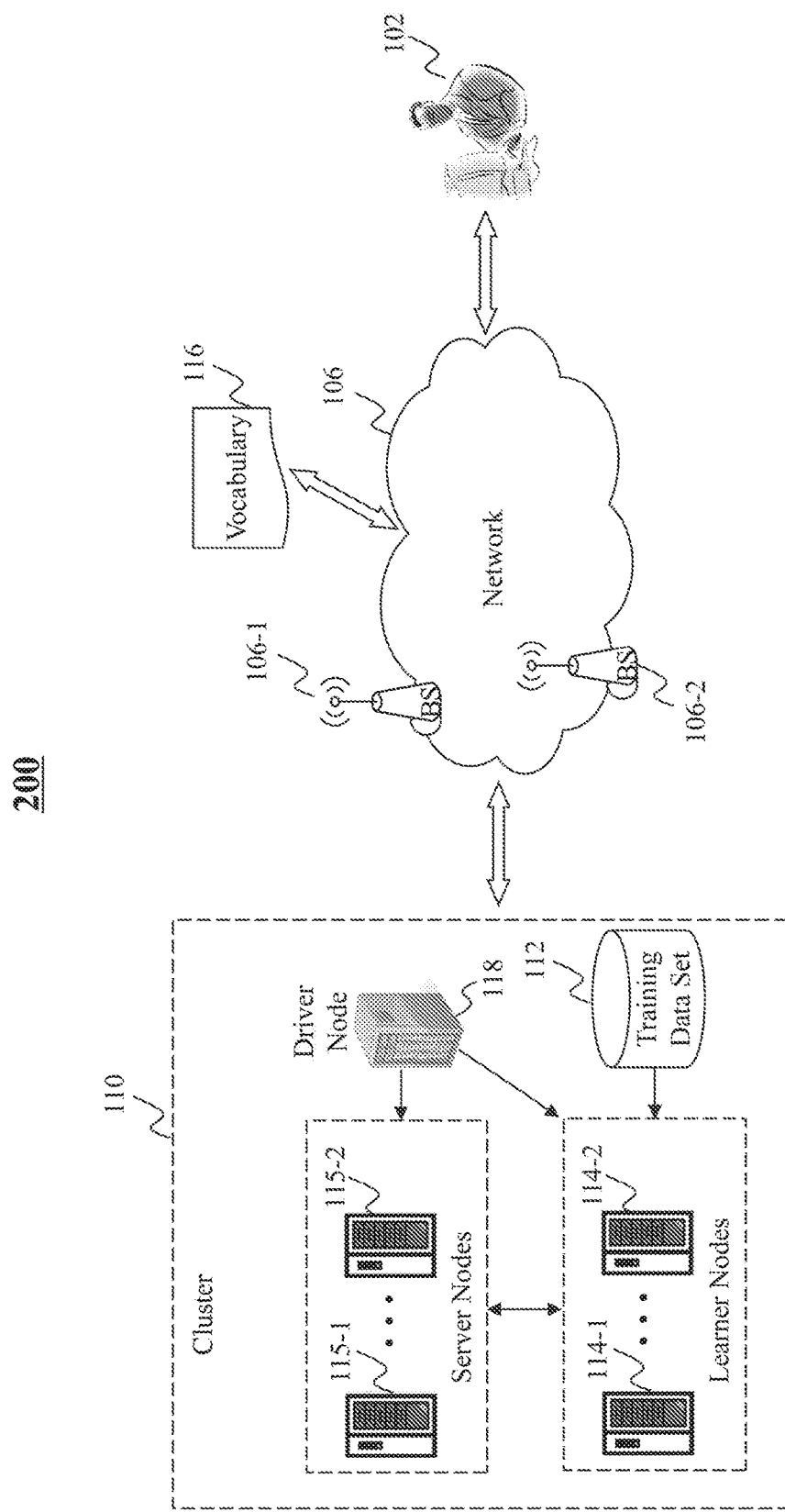
FIG. 2 is a high level depiction of another exemplary networked environment for distributed Word2Vec training on a cluster, according to an embodiment of the present teaching.

FIG. 2 is a high level depiction of another exemplary networked environment 200 for distributed Word2Vec training on a cluster, according to an embodiment of the present teaching. The exemplary networked environment 200 in this embodiment is similar to the exemplary networked environment 100 in FIG. 1, except that the vocabulary 116 is outside the cluster 110 and connected to the network 106.

Figure 3:
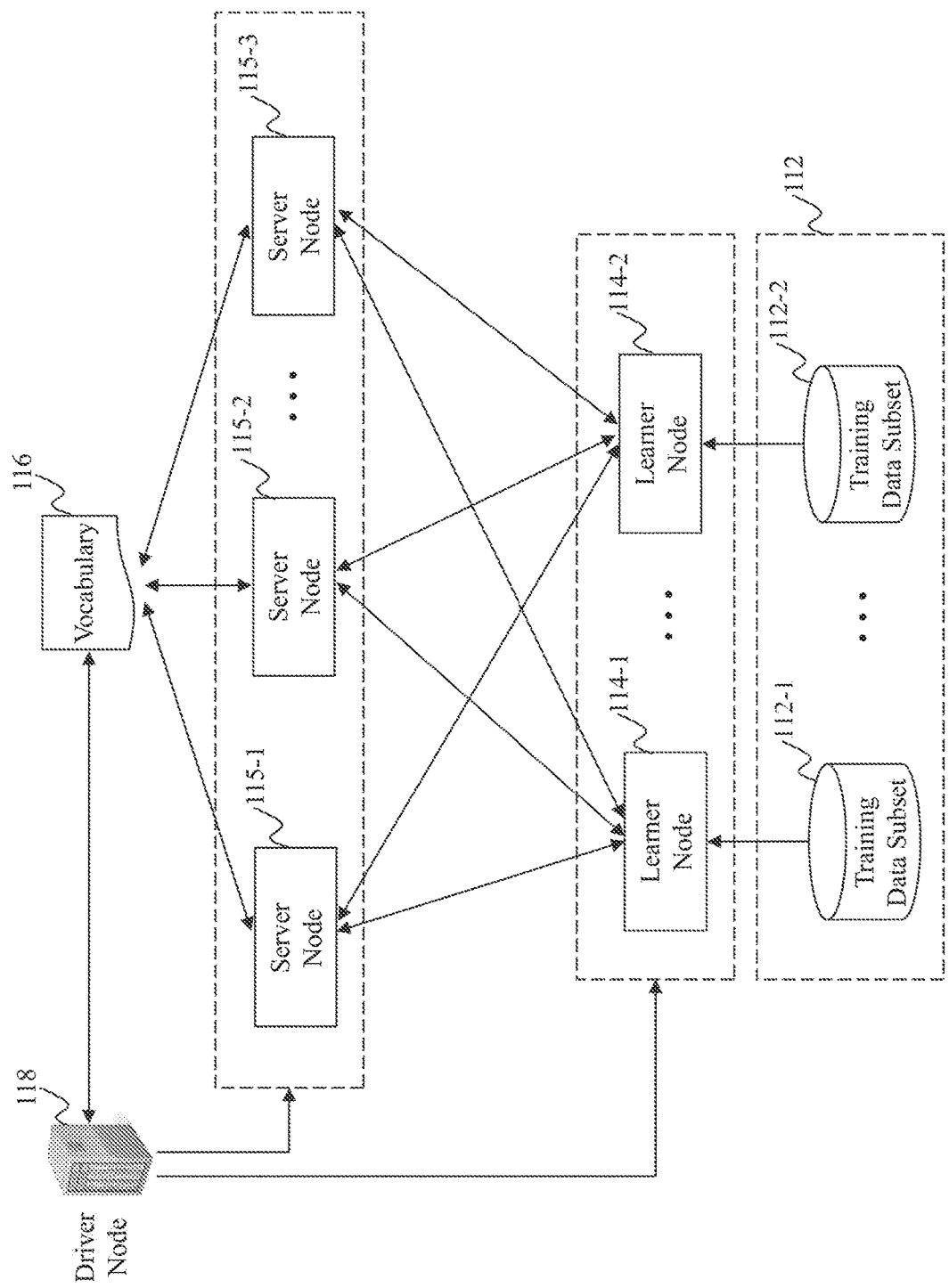
FIG. 3 illustrates an exemplary scheme of distributed Word2Vec training on a cluster, according to an embodiment of the present teaching.

FIG. 3 illustrates an exemplary scheme of distributed Word2Vec training on a cluster, according to an embodiment of the present teaching. As shown in FIG. 3, the cluster includes a driver node 118, one or more server nodes 115-1, . . . 115-3, one or more learner nodes 114-1, . . . 114-2, a vocabulary 116 that may be stored on a disk or a distributed file system in the cluster, and one or more training data subsets 112-1, . . . 112-2.

The cluster in this example is responsible for training the vectors of the Word2Vec model, based on the training data in the training data subsets 112-1, . . . 112-2. Given a corpus including a sequence of sentences $s_1, s_2, \ldots, S_n$ each of which is comprised of a sequence of words $s_i = w_{i,1}, w_{i,2}, \ldots, w_{i,mi}$, the present teaching follows a skip-gram approach to seek to maximize the following log likelihood:

$$\sum_{i=1}^{n} \sum_{j: w_{i,j} \in \mathcal{V}} \sum_{\substack{k \neq j: |k-j| \leq b_{i,j}, \\ w_{i,k} \in \mathcal{V}}} \left[ \log \sigma(u(w_{i,j}) v^T(w_{i,k})) + \sum_{\tilde{w} \in \mathcal{N}_{i,j,k}} \log(1 - \sigma(u(w_{i,j}) v^T \tilde{w})) \right] \quad (1)$$

over input and output word row vectors u(w) and v(w) with w ranging over the words in the vocabulary $\mathcal{V}$, where: σ (•) denotes the sigmoid function σ $(x)=1/(1+e^{-x})$; the window sizes $\{b_{i,j}\}$ are randomly selected between 1 and a maximum size B; the negative examples $\mathcal{N}_{i,j,k}$ associated with positive output word $w_{i,k}$ for input word $w_{i,j}$ are selected randomly according a probability distribution; and the vocabulary $\mathcal{V}$ includes the set of words for which vectors are to be learned.

FIG. 3 illustrates a distributed system for maximizing (1), according to one embodiment of the present teaching. The system has the following features: column-wise partitioning of word vectors among parameter server (PS) shards; no transmission of word vectors or vector gradients across network; distributed server-side generation of random negative examples via broadcasting of common random number generator seeds; interleaved mini batches; and distributed loading and parsing of data. The ability of the proposed system to avoid transmission of vectors and gradients can greatly reduce network bandwidth requirements. Mini-batching and concurrency may hide network latency.

In the proposed system, there are parameter server shards each of which stores a designated portion of each input (row) vector $u(w)=[u_1, u_2, \ldots, u_d]$ and output (row) vector $v(w)=[v_1, v_2, \ldots, v_d]$ (dependence of components on w is suppressed here). A parameter server shard may be implemented on a server node in FIG. 3. For example, assuming a vector dimension d=300, 10 server nodes, and equi-partitioned vectors, server node s∈{0, . . . , 9} would store the 30 components of u(w) and v(w) with indices i in the range 30s+1≤i≤30s+30. One can denote server nodes stored portion of u(w) and v(w) as $u_s(w)$ and $v_s(w)$, respectively. This may be referred to as a 'column-wise' partitioning of the vectors, or more specifically, of the matrix whose rows correspond to the word vectors, as in $$[(u^T(w_1) \ v^T(w_1) \ldots u^T(w_{|\nu|}) \ u^T(w_{|\nu|})]^T,$$

where the superscript T denotes vector/matrix transpose and $w_1, \ldots, w_{|\nu|}$ are the words in the vocabulary 116 according to a fixed ordering $\mathcal{O}$ (e.g., by decreasing frequency of occurrence in the corpus). For ease of reference, one can equate each word $w_\ell$ with $\ell$, its index in this ordering, so that $u(w_\ell) = u(\ell)$, and so on.

Figure 4:
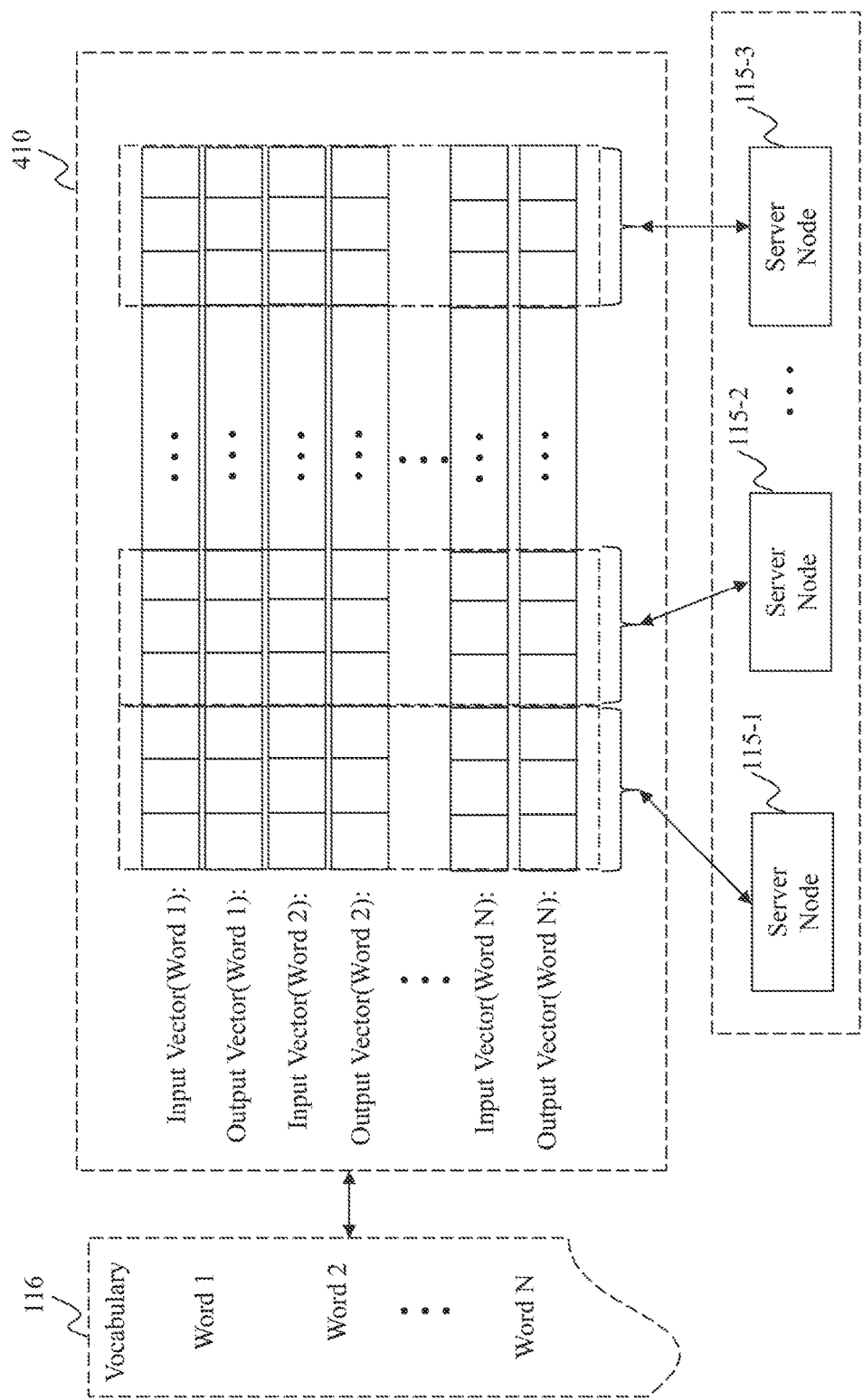
FIG. 4 illustrates an exemplary scheme for dividing vectors among different server nodes for Word2Vec training, according to an embodiment of the present teaching.

FIG. 4 illustrates an exemplary scheme for dividing vectors across different server nodes for Word2Vec training, according to an embodiment of the present teaching. As shown in FIG. 4, each word in the vocabulary 116 corresponds to two vectors, an input vector and an output vector. In one embodiment, a word may be represented by its input vector when it is treated as a center word for predicting context words for it; and may be represented by its output vector when it is treated as a context word (positive or negative) of another center word. A positive word with respect to a center word is semantically related to the center word. For example, a positive word may have an output vector that is close to the input vector of the center word, e.g. with a distance in a high-dimensional space less than a threshold. The distance may be a Euclidian distance or a cosine of the angle between the two vectors. A random negative word with respect to a center word is very unlikely to be semantically related to the center word. For example, a negative word may have an output vector that is far from the input vector of the center word, e.g. with a distance in a high-dimensional space farther than a threshold. The distance may be a Euclidian distance or a cosine of the angle between the two vectors.

As shown in FIG. 4, each vector, corresponding to a word in the vocabulary 116, may be divided into multiple portions, i.e. multiple sub-vectors. Each of the sub-vectors is allocated to one of the server nodes 115-1, . . . 115-3 in the cluster. As such, the word vectors are 'column-wise' partitioned when allocated to the server nodes.

Referring back to FIG. 3, the vectors can be initialized in the server nodes 115-1, . . . 115-3. Multiple clients running on learner nodes 114-1, . . . 114-2 may read in different portions of the corpus and interact with the server nodes 115-1, . . . 115-3 to carry out mini-batch stochastic gradient descent (SGD) optimization of (1) over the word vectors, e.g. following Algorithm 1 shown below. A corpus may be included in the training data 112 and can be partitioned into the training data subsets 112-1, . . . 112-2, each of which processed by one of the learner nodes 114-1, . . . 114-2. According to various embodiments of the present teaching, the learning algorithm may be based on architecture of skip-gram or continuous bag of words (CBOW).

The driver node 118 in FIG. 3 can select some nodes in the cluster to act as the learner nodes; select some nodes in the cluster to act as the server nodes; determine how to partition the word vectors for the words in the vocabulary 116; and determine how to divide the training data into the subsets. Basically, the driver node 118 may set up the stage for the distributed Word2Vec training on the cluster. In one embodiment, the driver node 118 may also be responsible for communicating with other clusters or users outside the cluster, with respect to the training.

Algorithm 1:

```
input : V : Vocabulary, {P_i}: training data partitions
output: u_i: Vectors for vocabulary words
 1   S = # of parameter servers needed for |V| words ;
 2   Launch parameter servers {PS_1, . . . , PS_S} onto Grid ;
 3   Initialize vectors in PS server ;
 4   for iteration ← 1, . . . , #Iterations do
 5   |   UnprocessedPartitions ← {P_i} ;
 6   |   for each executor, in parallel do
 7   |   |   while UnprocessedPartitions is non-empty do
 8   |   |   |   p ← next partition in UnprocessedPartitions ;
 9   |   |   |   Launch client cl connected to {PS_j} ;
10   |   |   |   for B ← minibatches in p do
11   |   |   |   |   seed = randomly select a seed ;
12   |   |   |   |   W_input ← Array(input word indices w_i,j);
13   |   |   |   |   for (i, j) ← B do
14   |   |   |   |   |   W_output,i,j ← Array (positive output word
     |   |   |   |   |   indices in window of input word at position
     |   |   |   |   |   (i, j)) ;
15   |   |   |   |   end
16   |   |   |   |   W_output ← Array (W_output,i,j for (i, j) ∈ B) ;
17   |   |   |   |   for s ← 1 to S, in parallel do
18   |   |   |   |   |   (F^+_s, F^-_s) = PS_s.dotprod(W_input,
     |   |   |   |   |   W_output, seed);
19   |   |   |   |   end
20   |   |   |   |   (F^+, F^-) ← Σ_s(F^+_s, F^-_s) ;
21   |   |   |   |   G^+ ← α(1 − σ(F^+)) ; G^- ← −ασ(F^-) ;
22   |   |   |   |   for s ← 1 to S, in parallel do
23   |   |   |   |   |   PS_s.adjust(W_input, W_output, G^+, G^-,
     |   |   |   |   |   seed);
24   |   |   |   |   end
25   |   |   |   end
26   |   |   end
27   |   end
28   end
29   return input vectors {u} from {PS_1,..., PS_S};
```

Specifically, the corpus may be partitioned into disjoint mini-batches with index sets $B_1, B_2, \ldots, B_N$ wherein each $B_h$ is a subset of (sentence index, word index) pairs. For each $B_h$ the word vectors can be adjusted, at corresponding server nodes, based on the gradient of the summation (1) restricted to the input words belonging to $B_h$, as given by $$\Lambda(\mathcal{B}_h) \triangleq \sum_{(i,j)\in\mathcal{B}_h} \Lambda_{i,j} \quad (2)$$

where $\Lambda_{i,j}$ denotes the inner most summation of (1) over $w_{i,k}$.

The gradient of $A(B_h)$ with respect to the word vector components is 0 for all word vector components whose corresponding words do not appear as inputs, outputs, or negative examples in (2). For the remaining components, the gradient is conveniently expressed in groups of components corresponding to specific word vectors. For example, consider a pair of indices $(i_o, j_o)$ belonging to $B_h$. The gradient components corresponding to the word vector $u(w_{i_o,j_o})$ can be expressed as $$\vec{\nabla}\Lambda(\mathcal{B}_h)\big|_{u(w_{i_o,j_o})} = \quad (3)$$

$$\sum_{(i,j)\in\mathcal{B}_h: w_{i,j}=w_{i_o,j_o}} \sum_{\substack{k\neq j:|k-j|\leq b_{i,j} \\ w_{i,k}\in V}} \left[(1-\sigma(u(w_{i_o,j_o})v^T(w_{i,k})))v(w_{i,k}) - \sum_{\tilde{w}\in N_{i,j,k}} \sigma(u(w_{i_o,j_o})v^T(\tilde{w}))v(\tilde{w})\right]$$

As shown above, the evaluation of $$\vec{\nabla}\Lambda(\mathcal{B}_h)\big|_{u(w_{i_o,j_o})}$$

requires computing the dot (or inner) products $$u(w_{i_o,j_o})$$

$v^T(\bullet)$ appearing in the arguments to σ and then computing linear combinations of the vectors $v(w_{i,k})$ and $v(\tilde{w})$, with weights depending on the dot products. A similar expression and computation applies to the other gradient components corresponding to other word vectors appearing in $\Lambda(\mathcal{B}_h)$. The vector $$u(w_{i_o,j_o})$$

(and, correspondingly, the other vectors as well) are updated according to an SGD update rule $$u(w_{i_o,j_o}) \leftarrow u(w_{i_o,j_o}) + \alpha\vec{\nabla}\Lambda(\mathcal{B}_h)\big|_{u(w_{i_o,j_o})} \quad (4)$$

where σ is a (suitably small) learning rate.

Once a client (e.g. implemented on a learner node) has assembled the indices (indexing according to the order $\mathcal{O}$ above) of positive output examples and input words corresponding to a mini-batch $\mathcal{B}_h$, it interacts with the server nodes to compute (3) and (4) using two remote procedure calls (RPCs), dotprod and adjust, which are broadcasted to all server nodes, along with an intervening computation to aggregate results from the dotprod RPCs returned by each server node.

Figure 5:
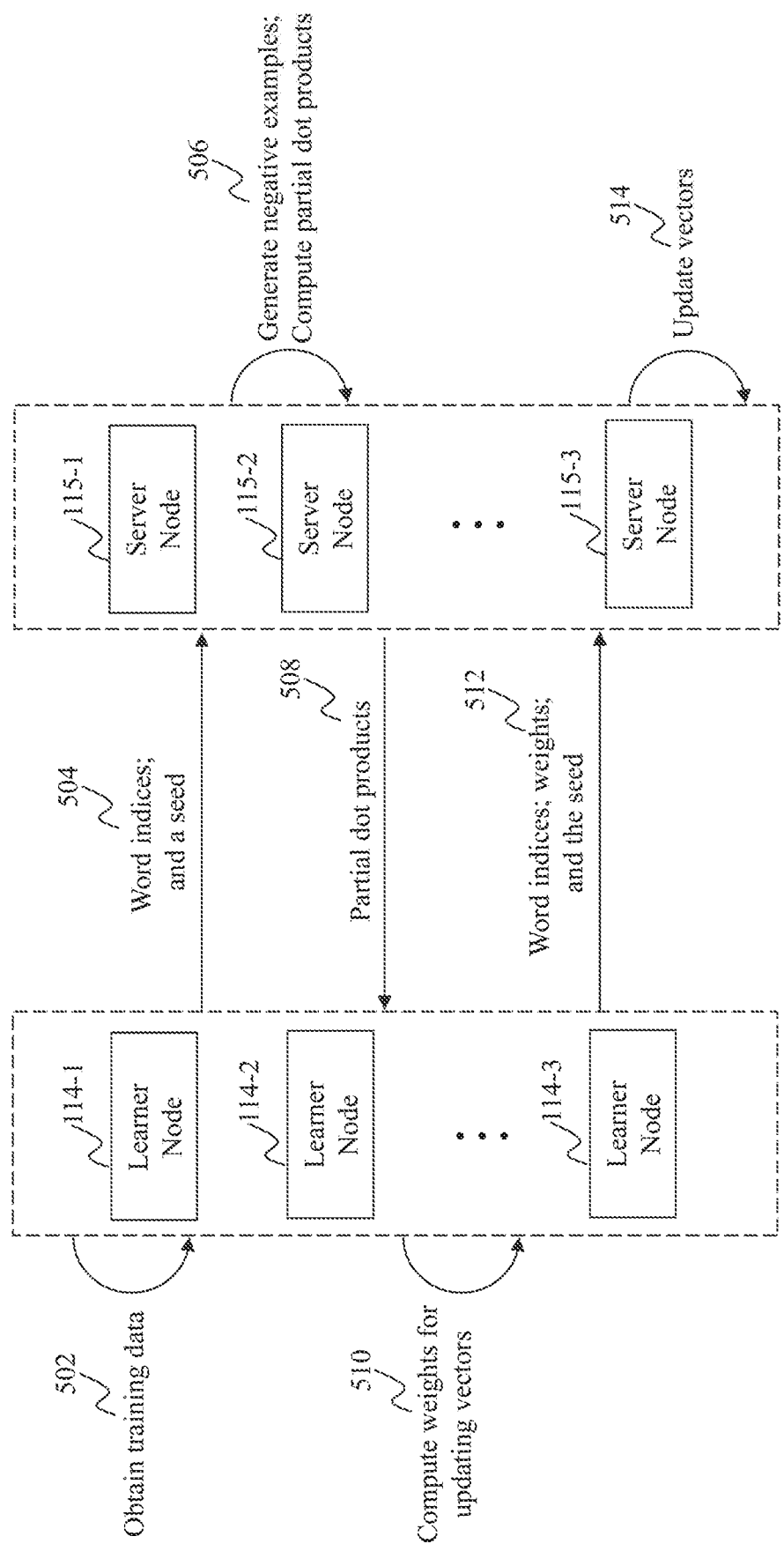
FIG. 5 illustrates a process of one client-server interaction in a Word2Vec training, according to an embodiment of the present teaching.

FIG. 5 illustrates a process of one client-server interaction in a Word2Vec training, according to an embodiment of the present teaching. As shown in FIG. 5, a learner node, which may be any learner node in the cluster, can obtain training data at 502, e.g. a mini-batch or subset of the corpus, for training the word vectors. Then, the learner node may send at 504 word indices and a random seed to each of the server nodes 115-1, . . . 115-3. The word indices may include one or more input indices for center words, and one or more output indices for one or more positive words that are semantically related to each center word. The center words and the one or more positive words may come from the obtained subset of the corpus at the learner node.

Each server node, after receiving the random seed and the word indices, can generate random negative examples; obtain sub-vectors based on the received word indices and the generated random negative example indices; and compute partial dot products at 506. In one example, the random seed is a client thread supplied seed that can initialize a random number generation for one or more random indices of exemplary negative words that are not semantically related to the center word. For example, for a center word "NBA", positive words may include "basketball", "championship", "Michael Jordan", etc., while negative words may include "computer", "airplane", "potato", etc. The word indices may be used at a server node to locate their respective corresponding vectors or sub-vectors. In some sense, the training system and method disclosed herein may derive vectors that optimize the performance of a classification task involving the center target words, the positive words, and the negative examples.

Then, the server node may perform the partial dot products, according to the RPC call, e.g. following the Algorithm—dotprod shown below. As shown in the Algorithm—dotprod, after selecting negative examples $\tilde{w}$ in (3) according to a probability distribution, and with the client thread supplied seed initializing the random number generation, the algorithm returns all partial dot products required to evaluate the gradient (3) for all positive output, negative output, and input word vectors associated with the mini-batch, wherein the partial dot products involve those vector components stored on the designated server node: $u_s y_s^T$.

the aggregated dot products. These weights are then passed to the adjust RPC, along with the seeds for regenerating the identical random negative example indices $\tilde{w}$ that were generated during the dotprod RPC. This retransmission can simplify the work of the server nodes in that state need not be maintained between corresponding dotprod and adjust calls. The same seeds may be sent to all server nodes in both RPC calls so that each server node generates the same set of negative example indices. The server nodes are multi-threaded and each thread handles the stream of RPC calls coming from all client threads running on a single learner node.

At 514, each server node may update corresponding sub-vectors, according to the adjust RPC call, e.g. following the Algorithm—adjust shown below. As shown in the Algo-

---

Algorithm - dotprod:

```
1   (float[ ], float[ ]) PS_s .dotprod(int[ ] W_input, int[ ][ ] W_output, long seed)
2   R ← Random Number Generator initialized with seed ;
3   pos = 1; neg = 1 ;
4   for i ← 1 to |W_input| do
5   |     for j ← 1 to |W_output[i]| do
6   |     |     w_I ← W_input[i]; w_O ← W_output[i][j] ;
7   |     |     NS ← Array(N negative word indices ≠ w_O, generated
    |     |          using R) ;
8   |     |     F^+ [pos++] = u_s(w_I)v_s^T (w_O) ;
9   |     |     for ns ← NS do
10  |     |     |          F^- [neg++] = u_s(w_I)v_s^T (ns) ;
11  |     |     end
12  |     end
13  end
14  return (F^+_s , F^-_s )
```

---

At 508, each server node may send its partial dot products to the corresponding learner node sending the word indices for computing the partial dot products.

At 510, the learner node can compute weights for updating vectors at the server nodes, i.e. updating each sub-vector at a corresponding server node. Then, the learner node sends another RPC at 512 to the server nodes for performing adjust. Between these two RPCs, i.e., at 510, the client at the learner node can compute linear combination weights needed for adjust by summing the partial inner products returned by the server nodes in response to the dotprod RPC calls and evaluating the sigmoid function at values given by rithm—adjust, each server node can regenerate negative examples used in preceding associated dotprod call using the same seed that is again supplied by the client thread; and compute (4) for vector components associated with the mini-batch stored on the server node as a partial vector linear combination using weights received from the client, restricted to components stored on the server node.

In one embodiment, a server node may send the updated sub-vectors back to the learner nodes once for each iteration over the entire data set.

---

Algorithm - adjust:

```
1   void PS_s.adjust(int[ ] W_input, int[ ][ ] W_output, float[ ] G^+ , float[ ]
    G^- , long seed)
2   R ← Random Number Generator initialized with seed ;
3   pos = 1; neg = 1 ;
4   Δu_s(•) = 0; Δv_s(•) = 0 ;
5   for i ← 1 to |W_input| do
6   |     for j ← 1 to |W_output[i]| do
7   |     |     w_I ← W_input[i]; w_O ← W_output[i][j] ;
8   |     |     NS ← Array(N negative word indices ≠ w_O, generated
    |     |          using R) ;
9   |     |     Δu_s(w_I)+=G^+[pos]v_s(w_O);
    |     |     Δv_s(w_O)+=G^+[pos++]u_s(w_I) ;
10  |     |     for ns ← NS do
11  |     |     |          Δn_s(w_I)+=G^-[neg]v_s(ns);
    |     |     |          Δv_s(ns)+=G^-[neg++]u_s(w_I) ;
12  |     |     end
13  |     end
14  end
15  for all w do
16  |          u_s(w)+=Δu_s(w); v_s(w)+=Δv_s(w)
17  end
```

In a typical at-scale run of the system, the above process may be carried out by multiple client threads running on each of a few hundred nodes, all interacting with the PS shards at the server nodes in parallel. The training dataset is iterated over multiple times, e.g. 5 to 10. The learning rate σ is reduced after each iteration round. There is no locking or synchronization of the word vector state within or across shards or across client threads during any part of the computation. The vectors may suffer very little quality degradation as a result.

Two elements of the systems and methods may be important to aiding convergence in some data sets. One is that in the adjust computation, the word vectors belonging to the mini-batch are not updated until the end of the call so that references to word vectors throughout the call are to their values at the start of the call. The second is the mini-batch formation, which ensures that indices $(_{i,j})$ of input words belonging to a mini-batch are sufficiently separated in the training corpus, and ideally, belong to different sentences. This allows input word vectors within a sentence (which are linked through their overlapping output word windows) to "learn" from each other during a single training iteration, as their respective mini-batches are processed.

Once the vectors of vocabulary words are trained, many applications of the vectors are related to finding the top-k words for a given target word. The sponsored search use case, for example, needs to find the top-M ads for a given query. In one example, one can develop a solution based on Locality Sensitive Hashing (LSH) techniques, wherein the constituent 1-bit hash function applied to a given vector is the classical one for cosine similarity: the sign of the inner product with a random vector. The LSH solution may be built on Spark, in the context of the sponsored search use case (though can be applied more generally), and assign partitions of queries to executors which build the L K-bit LSH tables for their partition of query vectors in memory. The ads are then read in parallel by each executor from HDFS and, for each ad, queries in the partition for which it might be a top ad are found by LSH lookup in the partition query LSH tables (i.e., at least one of the L hashes matches the corresponding hash of the ad vector). The cosine similarities between the ad and candidate queries, based on their respective vectors, are then computed and, if above a configurable threshold, are compared to the running top-k ads for each query using an efficient data structure to maintain these ads. At this point there might be a (small) fraction of queries for which no sufficiently similar ads were found (cosine similarities based on vectors are below a threshold). These queries are reprocessed and again compared against all ads in a similar distributed computation, but with full computation of cosine similarities (i.e., no LSH). The resulting top ads per query are saved to HDFS. The size of the query partitions processed can be set based on node memory, as the partition LSH table must fit in memory. This solution, when deployed on 16 GB Spark executors, exhibited a 8 times speedup over a distributed brute-force, full-comparison solution for a problem involving 145M queries and 30M ads. For this case, K=32 and L=300 were found to work well and were obtained using an off-line tuning process on a small random sample of the query-ad vectors. Only about 10% of query vectors fell through to full search.

Figure 6:
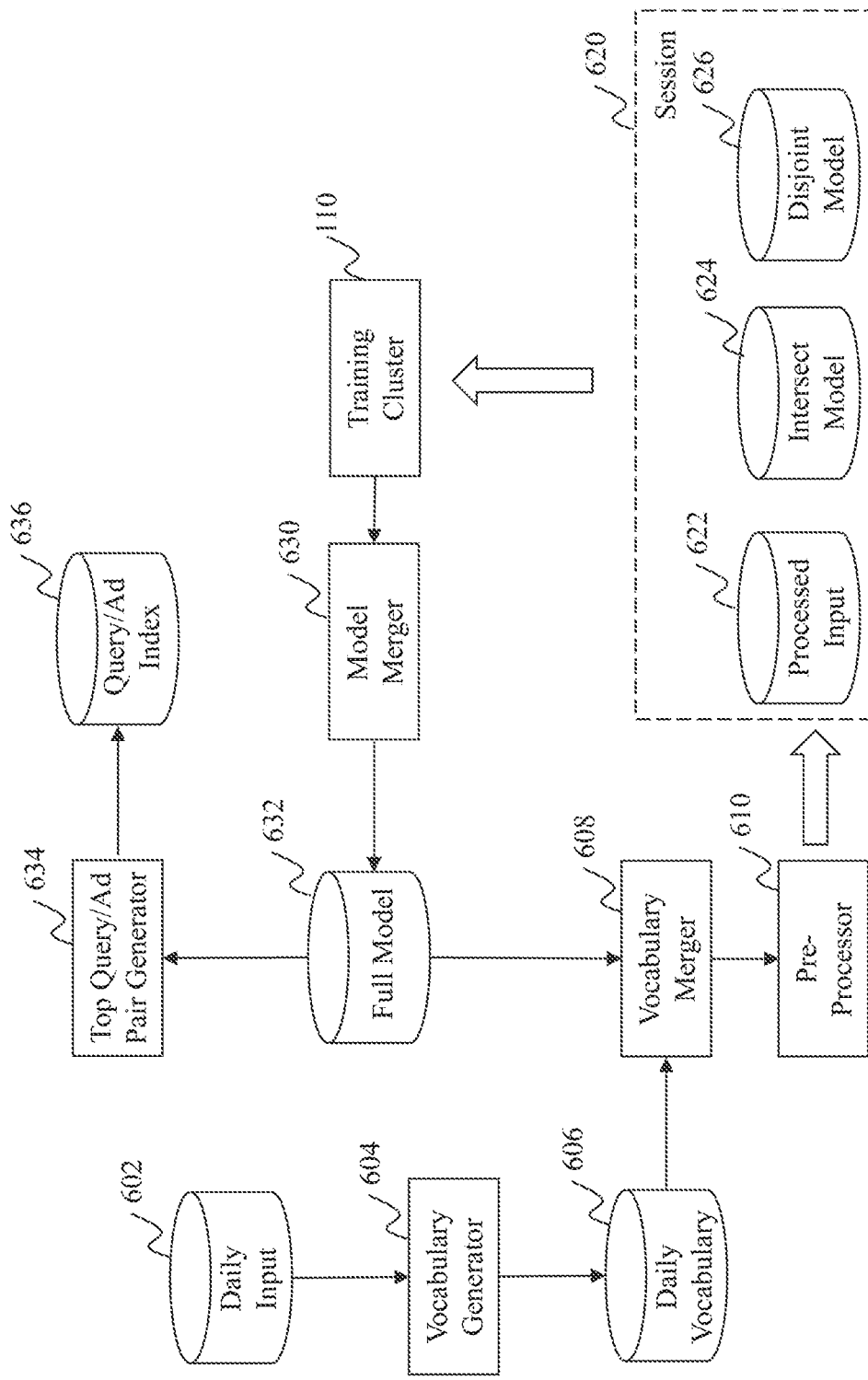
FIG. 6 illustrates an exemplary scheme for an incremental Word2Vec training with daily vector update, according to an embodiment of the present teaching.

FIG. 6 illustrates an exemplary scheme for an incremental Word2Vec training with periodic vector update, according to an embodiment of the present teaching. As shown in FIG. 6, the vocabulary generator 604 may generate vocabularies 606 from daily training data 602. For example, new search session data may come in on a daily basis. To perform training, the system can extract the vocabulary from that data, which are words that occur sufficiently frequently in that day plus several previous days. Once the system obtains a new list of words, the vocabulary merger 608 may merge it with a running list of vocabulary words that also includes words from previous days.

For example, after the system trained the model on data over a year, the system obtains some more data coming in, e.g. data of a new week. It is costly for the system to retrain on the entire data set, including data of the week and the old data used before. In the incremental training scheme shown here, the system trains only on the new data that never occurred before, while word vectors having occurred before may change as a result of the training. The full model 632 may refer to an entire set of vectors trained on all data that have been obtained by the system. When the vocabulary merger 608 merges vocabulary, with respect to this incremental training, it can identify words that already have vectors in the running vocabulary and words that are new and occur in the current new portion of the training data. The vocabulary merger 608 can then select words to be used for training vectors in the new portion of the training data. In one example, the selected words may include those new words that occur sufficiently many times and words that occurred before and appear sufficiently many times in a combination of the new data and the old data.

The pre-processor 610 may go through the training set and replace each word by its index in the vocabulary. Before running the training process in the training cluster 110, the system may select training data in each session 620. The system may determine to train based on not only the new data, but also some portion of the old data. For example, using a sliding window of a month, the system can determine to train based on data from now back to a month ago. The one month period is moved forward as new data comes in. For example, if new data of a week comes in, the system can merge data of that week with data from the previous three weeks, and compute the vocabulary for the merged data. Then the session 620 will include a new four-week chunk of data to be trained on the cluster 110.

The processed input 622 includes data pre-processed by the pre-processor 610. The disjoint model 626 includes new vectors that have never been seen before, i.e. brand new words that were never trained before. This may be because they did not occur sufficiently many times. But with the addition of this new week, they do occur sufficiently many times in the session. The intersect model 624 includes vectors that have been trained before.

The system may initialize the vectors in the intersect model 624 with those values that are already in the full model prior to the incremental training. The system may initialize randomly the vectors for the disjoint model.

The intersect model 624 and the disjoint model 626 in FIG. 6 would be mapped onto the vectors in the server nodes in FIG. 3. For example, the system may store the intersect model vectors and/or the disjoint model vectors onto a distributed file system, and load the vectors into the server nodes to initialize those vectors prior to training. The processed input 622 may include the different portions of the training data set 112 in FIG. 3.

After training in the training cluster 110, the model merger 630 may update the vectors for the intersect part of the full model 632; and add new vectors from the disjoint part to the full model 632. As such, after updated vectors are computed, e.g. for those impacted queries/ads/pages, they may be merged with previous vectors to produce a full vector set.

In one embodiment relevant to a sponsored search application, the top query/ad pair generator 634 may take all the query vectors in the full model 632, and compute the k nearest advertisements based on vector similarities. In one example, the vector similarity is the cosine of the angle between the vectors. For every query/ad pair in the full model 632, the system computes the cosine similarity between the vectors of the query and the ad in the pair. Then for each query, the system can return the k closest ads in terms of this vector similarity. As such, the system can create a huge query/ad index 636 of e.g. 100 million of queries, along with e.g. the top 100 ads for each query.

In one embodiment, the Word2Vec model trained in the present teaching may be implemented in sponsored search query-to-ads matching. In this case, training data are a collection of user search sessions, each of which is s= $\{w_1, \ldots, w_n\}$ a sequence of queries, ads and pages (analogous to a sentence in NLP). Let Q, A and P be the vocabulary of queries, ads and pages, respectively. From the existing search sessions, the system will learn the vector of w∈Q U A U P, and identify the top candidate ads $\{a_1, \ldots, a_r\}$ ⊂ A for each query q∈Q where the cosine similarity of q and $a_i$ (1<=i<=r) are bigger than a certain threshold. For example, in one application, the disclosed method and system needed to handle |Q|=140M, |A|=40M and |P|=20M, and thus total 200M vocabularies. From a training dataset of 58B words, word vectors of 300 dimensions are produced via skip-grams with up to 10 context words and 5 negative samples per output word.

By applying a training method proposed in the present teaching, e.g. Algorithm 1 including Algorithm—dotprod and Algorithm—adjust, the system can minimize data movement, and leverage computing power of Spark nodes and Parameter Server nodes, so that the batch training of vectors took about 2 days.

By applying Algorithm 1, candidate ads are identified for all queries. Among 140M queries, about 138M queries have at least one ad with cosine similarity over 0.75. There were in total 13.4B query/ad pairs found.

Figure 13:
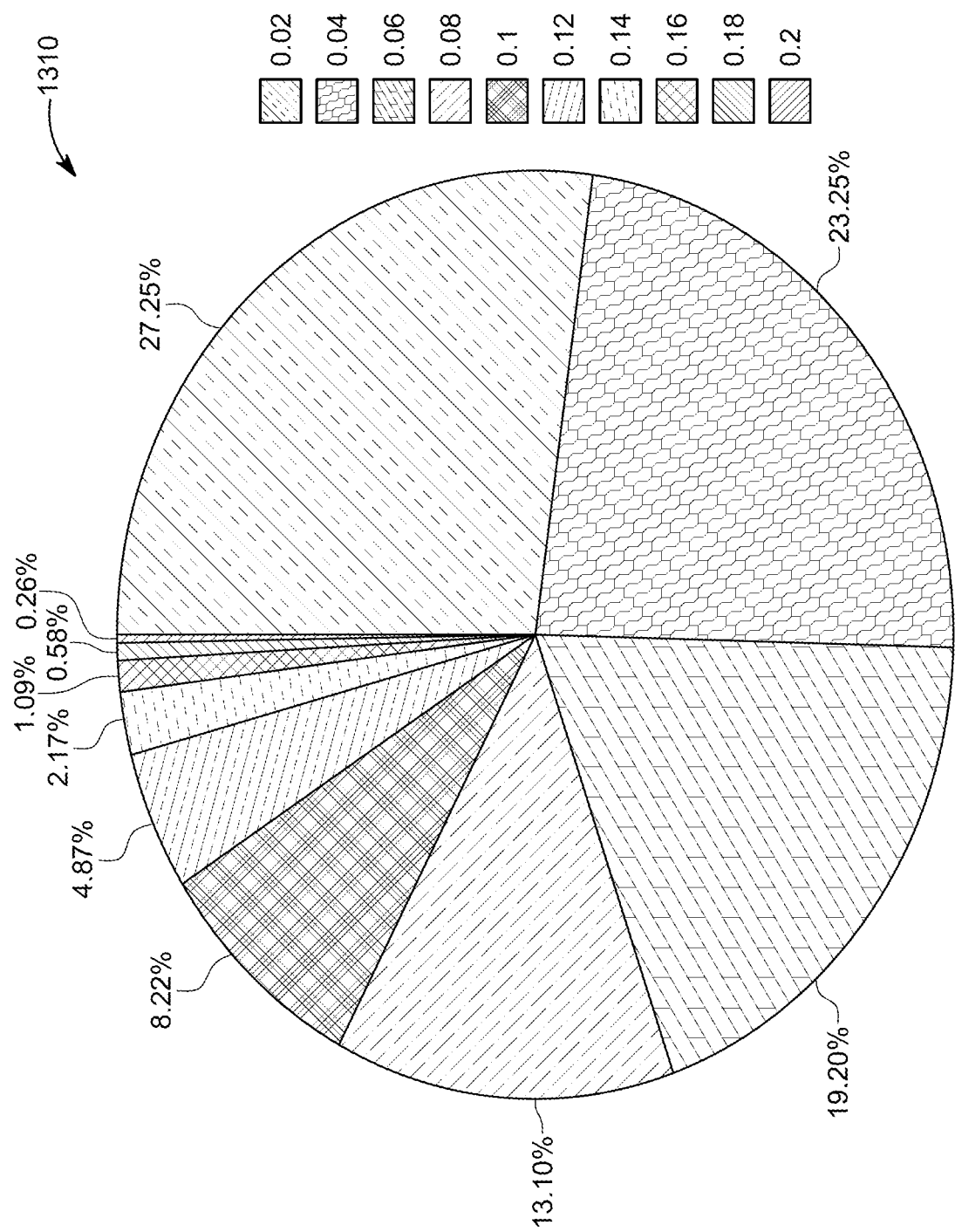
FIG. 13 illustrates a comparison of the differences of cosine similarity between the distributed solution disclosed herein and a single machine implementation for a smaller vocabulary, according to an embodiment of the present teaching.

To verify the accuracy of Algorithm 1, FIG. 13 illustrates a comparison 1310 of the differences of cosine similarity between the distributed solution disclosed herein, according to an embodiment of the present teaching, and a single machine implementation for a smaller vocabulary, according to the prior art. As illustrated in FIG. 13, over 50% of word pairs have differences less than 0.06, and 91% of word pairs have differences less than 0.1. Looking into some word pairs, it is noticed that vectors trained according to the method disclosed herein represent the relationship between words more accurately in many cases. For example, vectors for queries "facebook sign in" and "facebook register" had 0.596 cosine similarity according to the distributed solution disclosed herein, while the single machine solution had 0.436. Accuracy improvement is believed to be due to the capability of the distributed method to train words for a larger vocabulary.

Figure 14:
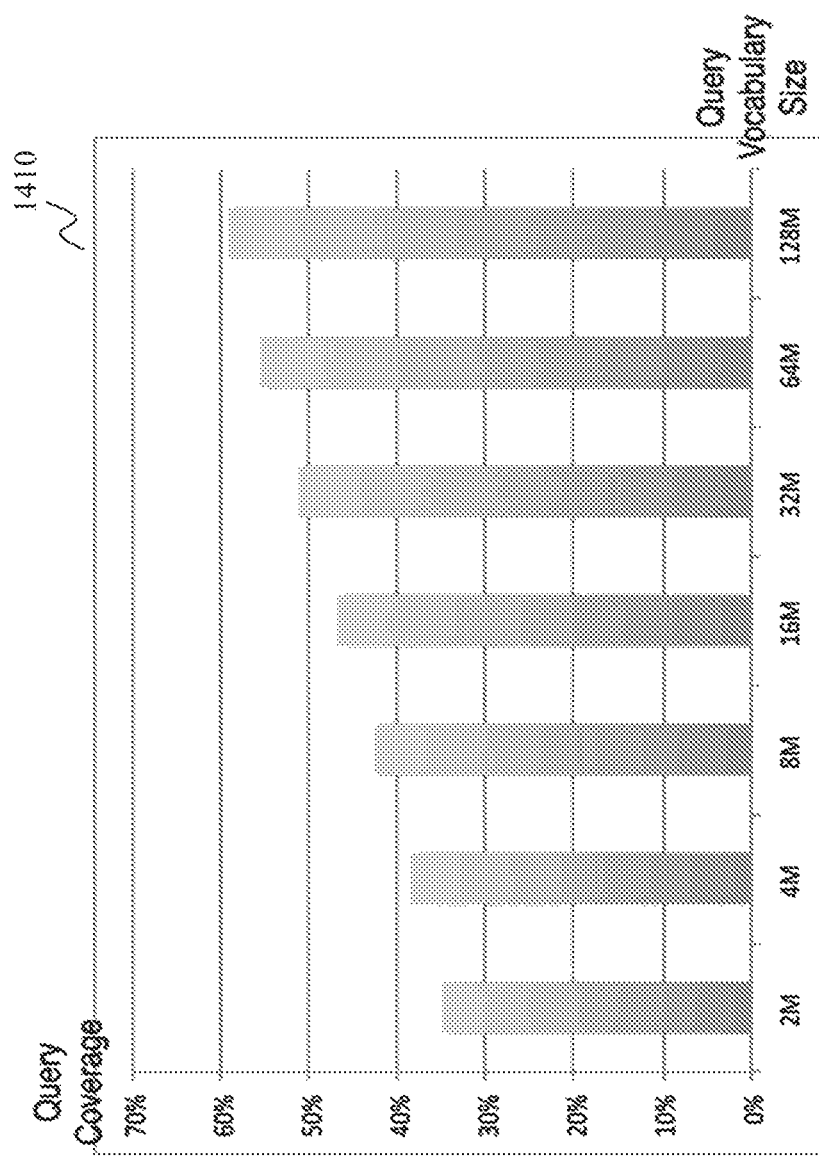
FIG. 14 illustrates how query coverage grows as the query vocabulary size increases, according to an embodiment of the present teaching.

FIG. 14 illustrates how query coverage grows as the query vocabulary size increases, according to an embodiment of the present teaching. Query coverage is the percentage of search query instances that have at least one matching ad. The graph 1410 in FIG. 14 summarizes how query coverage grows as the query vocabulary size |Q| increases.

Figure 7:
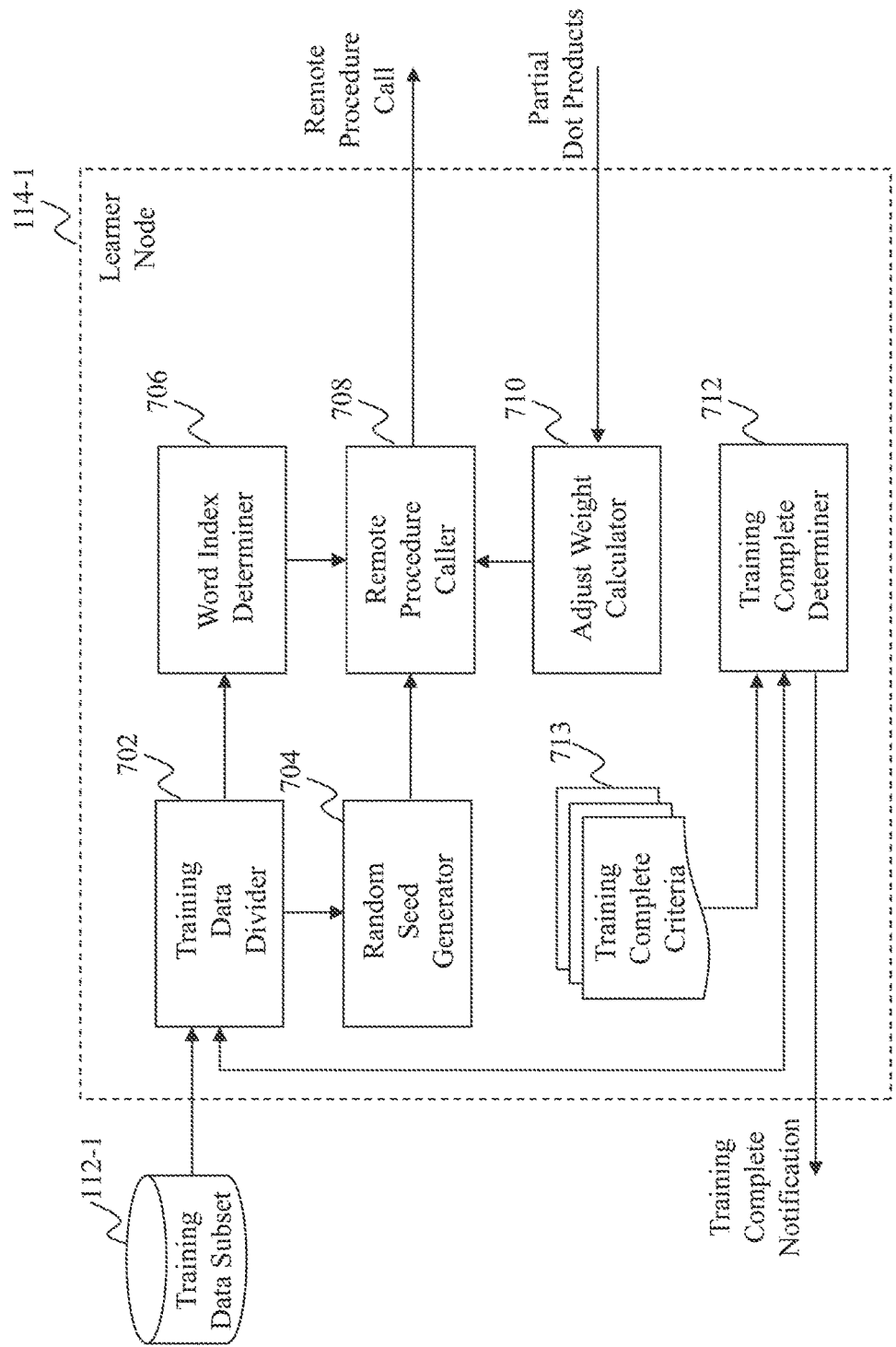
FIG. 7 illustrates an exemplary diagram of a learner node, according to an embodiment of the present teaching.

FIG. 7 illustrates an exemplary diagram of a learner node 114-1 in a cluster, according to an embodiment of the present teaching. The learner node 114-1 in this example includes a training data divider 702, a random seed generator 704, a word index determiner 706, a remote procedure caller 708, an adjust weight calculator 710, a training complete determiner 712 and one or more training complete criteria 713. The other learner nodes in FIG. 3 may have the same structure as that of the learner node 114-1.

The training data divider 702 in this example can read training data from the training data subset 112-1, and divide the training data into multiple partitions. The training data divider 702 may send each partition to the word index determiner 706 for determining word indices belonging to mini batches, and to the random seed generator 704 for generating a random seed.

The random seed generator 704 in this example may generate a random seed for the mini batches in the partition received from the training data divider 702. As discussed above, the random seed may be used on the server nodes for generating negative examples. The random seed generator 704 may send the random seed to the remote procedure caller 708 for sending a remote procedure call.

The word index determiner 706 in this example may determine word indices belonging to the mini batches in the partition received from the training data divider 702. As discussed above, the word indices may include input word indices for center words and output word indices for positive context words of a center word. For example, a positive output word index may be in a window around a corresponding input word index for the center word.

The remote procedure caller 708 in this example may generate and send a remote procedure call (RPC) to the server nodes in the same cluster. In one example, the remote procedure caller 708 may send an RPC for computing dotprod at the server nodes, as illustrated in Algorithm—dotprod. In this case, the RPC includes information about the word indices determined at the word index determiner 706 and the random seed generated at the random seed generator 704.

After the remote procedure caller 708 sends the RPC for dotprod, the adjust weight calculator 710 may receive partial dot products from the server nodes. The partial dot products are computed by the server nodes based on information in the RPC for dotprod. Based on the partial dot products, the adjust weight calculator 710 may calculate weights for updating or adjusting vectors at the server nodes. As discussed above, the server nodes will compute a partial vector linear combination based on the weights calculated at the adjust weight calculator 710.

The adjust weight calculator 710 may then send the weights to the remote procedure caller 708 to generate and send another RPC for adjust. In that case, the remote procedure caller 708 may send an RPC for computing adjust at the server nodes, as illustrated in Algorithm—adjust. In this case, the RPC includes information about the word indices determined at the word index determiner 706, the random seed generated at the random seed generator 704, and the weights calculated at the adjust weight calculator 710.

The training complete determiner 712 in this example may determine whether the training based on the training data subset 112-1 is complete or not. This determination may be based on the one or more complete criteria 713 stored in the learner node 114-1. For example, according to one criterion, the training is complete when all partitions of the training data subset 112-1 are processed. In another example, according to one criterion, the training is complete when all partitions of the training data subset 112-1 are processed for a certain number of iteration rounds. When the training complete determiner 712 determines that the training is not complete, the training complete determiner 712 may inform the training data divider 702 to continue processing the next unprocessed partition, in the current iteration round. When the training complete determiner 712 determines that the training is complete, the training complete determiner 712 may inform the driver node that the training based on the training data subset 112-1 is complete.

Figure 8:
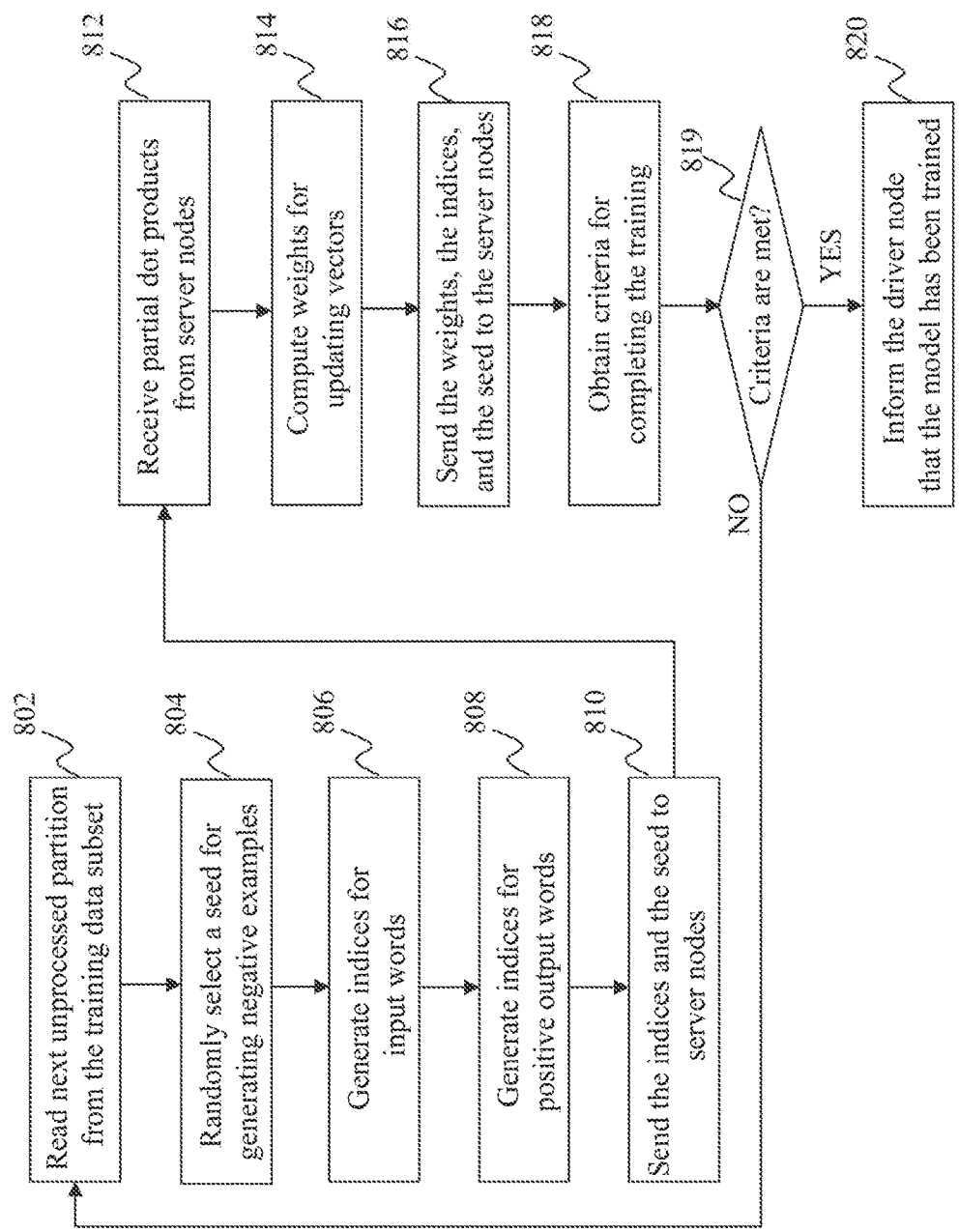
FIG. 8 is a flowchart of an exemplary process performed by a learner node, according to an embodiment of the present teaching.

FIG. 8 is a flowchart of an exemplary process performed by a learner node, e.g. the learner node 114-1 in FIG. 7, according to an embodiment of the present teaching. A sufficient number of words forming a minibatch is read at 802 from a corresponding training data subset. A seed is randomly selected at 804 for generating negative examples. At 806, word indices are determined for input words in the training data. At 808, word indices are generated for positive output words in the training data.

At 810, the word indices and the randomly generated seed are sent to the server nodes for computing partial dot products. The partial dot products computed at the server nodes are received at 812 from the server nodes. Linear combination weights are computed at 814 for updating vectors at the server nodes. The weights, along with the word indices and the randomly generated seed, are sent at 816 to the server nodes for adjusting the vectors.

One or more criteria for completing the training are obtained at 818. It is determined at 819 whether the criteria are met. If so, the process moves on to 820 where the driver node is informed that the model has been trained based on the corresponding training data subset. If not, the process may move back to 802 for reading next unprocessed partition in the training data subset.

Figure 9:
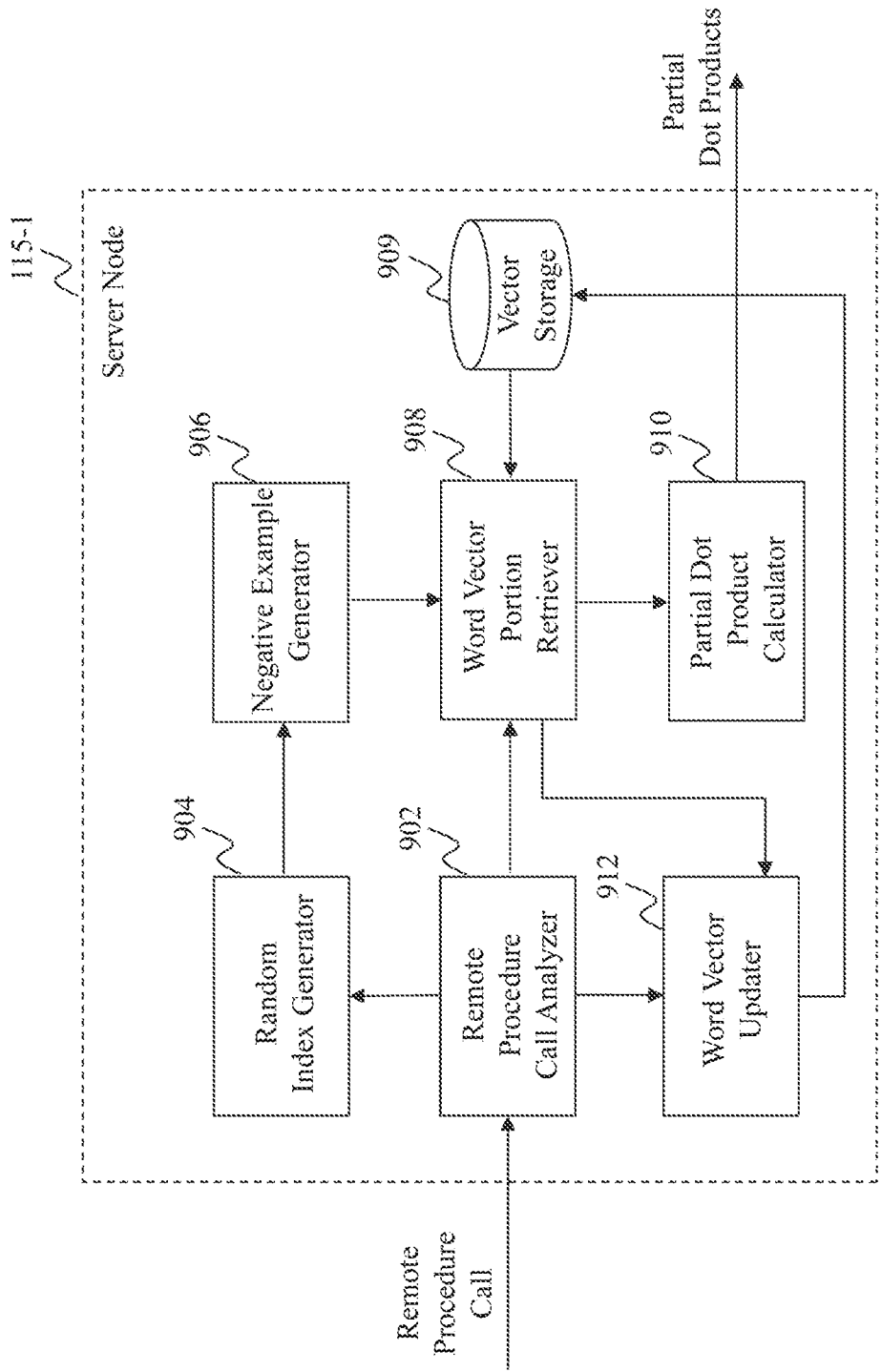
FIG. 9 illustrates an exemplary diagram of a server node, according to an embodiment of the present teaching.

FIG. 9 illustrates an exemplary diagram of a server node 115-1, according to an embodiment of the present teaching. The server node 115-1 in this example includes a remote procedure call analyzer 902, a random index generator 904, a negative example generator 906, a word vector portion retriever 908, vector storage 909, a partial dot product calculator 910, and a word vector updater 912. The other server nodes in FIG. 3 may have the same structure as that of the server node 115-1.

The remote procedure call analyzer 902 in this example may receive RPCs from a learner node, and analyze each RPC to determine information included in the RPC. An RPC may include "get" and/or "put" RPC operations. A "get" RPC operation asks for one or more vector components to be sent back to client; while a "put" RPC operation sends one or more vector components to be stored in vector storage.

For example, an RPC for dotprod may include information about word indices and a random seed, while an RPC for adjust may include information about word indices, a random seed, and combination weights. The remote procedure call analyzer 902 may send the random seed to the random index generator 904 for generating a random index or indices. The remote procedure call analyzer 902 may send the word indices to the word vector portion retriever 908 for locating word sub-vectors in the nodes memory. The remote procedure call analyzer 902 may send the linear combination weights to the word vector updater 912 for updating the word sub-vectors.

The random index generator 904 in this example may generate a random index based on the random seed received from the remote procedure call analyzer 902. In one example, the random index may be a random number generated at the server node. The random index generator 904 may send the random index to the negative example generator 906 for generating negative examples. The random index generator 904 may also forward word indices of input words and word indices of positive output words to the negative example generator 906.

The negative example generator 906 may generate negative examples, based on the random indices and the word indices. As discussed above, each negative example may be an exemplary word that is not semantically related to a center word, e.g. when a distance between the output vector of the negative example and the input vector of the center word is larger than a threshold. The negative example generator 906 may send information about the negative examples, e.g. word indices for the negative examples, to the word vector portion retriever 908 for retrieving partial vectors or sub-vectors.

The word vector portion retriever 908 in this example receives word indices for the center and positive context words, and word indices for the negative examples. Based on the word indices, the word vector portion retriever 908 may locate the corresponding partial vectors from the vector storage 909. The vector storage 909 may be in the memory of the server node 115-1. The corresponding partial vectors may include the partial input vectors for the center words, the partial output vectors for the positive context words, and the partial output vectors for the negative example words.

The word vector portion retriever 908 may also receive information about the RPC from the remote procedure call analyzer 902. When the RPC is for dotprod, the word vector portion retriever 908 may send the located partial vectors to the partial dot product calculator 910 for calculating partial dot products. When the RPC is for adjust, the word vector portion retriever 908 may send the located partial vectors to the word vector updater 912 for adjusting the partial vectors.

The partial dot product calculator 910 in this example may calculate the partial dot products, based on the located partial vectors received from the word vector portion retriever 908, e.g. according to the Algorithm-dotprod. In one example, the partial dot products include inner products each of which is either between a partial input vector for a center word and a partial output vector for a corresponding positive context word, or between a partial input vector for a center word and a partial output vector for a corresponding negative example word. The partial dot product calculator 910 may send the calculated partial dot products to the learner node from which the RPC dotprod was received.

The word vector updater 912 in this example may calculate updated partial vectors, based on the located partial vectors received from the word vector portion retriever 908 and based on the linear combination weights received from the remote procedure call analyzer 902, e.g. according to the Algorithm-adjust. The partial dot product calculator 910 may store the updated partial vectors back to the vector storage 909 after the update. In one embodiment, after each iteration round over the entire training data set, the learner nodes may request that the server node send all or some subset of partial vectors in its vector storage.

Figure 10:
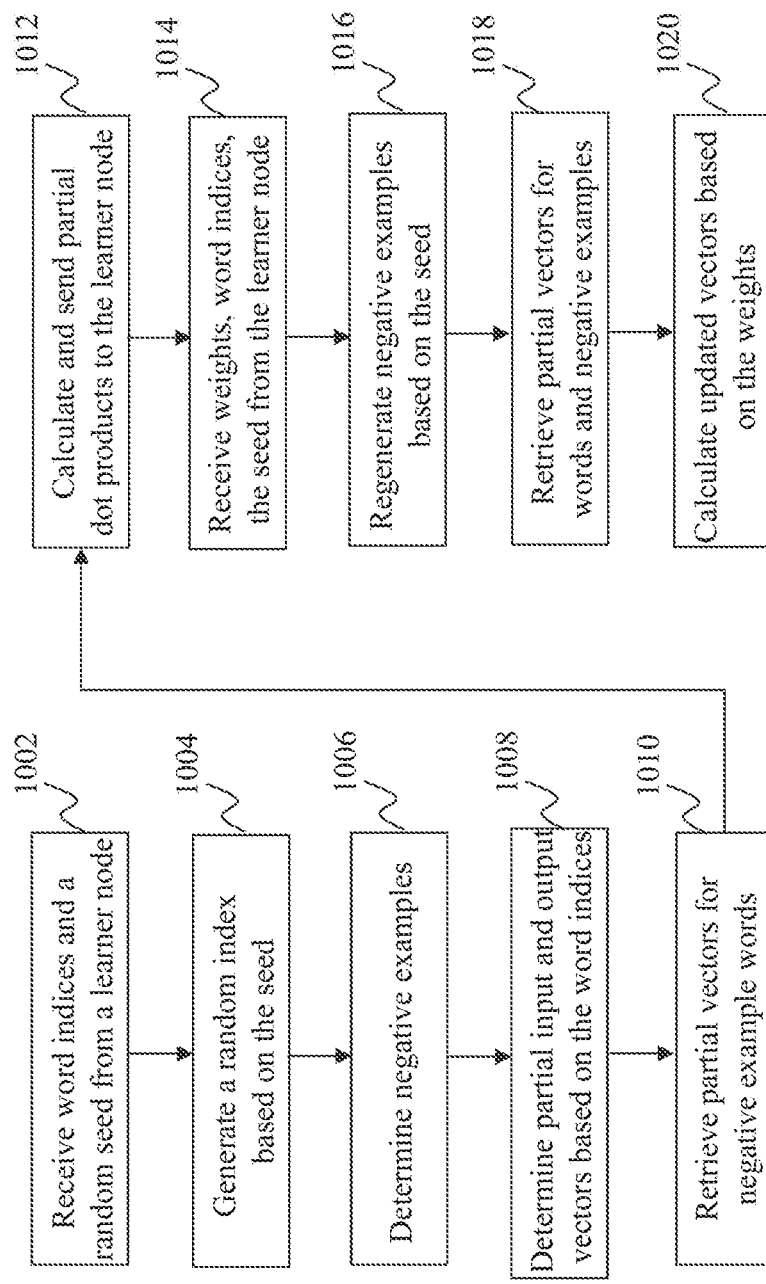
FIG. 10 is a flowchart of an exemplary process performed by a server node, according to an embodiment of the present teaching.

FIG. 10 is a flowchart of an exemplary process performed by a server node, e.g. the server node 115-1 in FIG. 9, according to an embodiment of the present teaching. At 1002, word indices and a random seed are received in an RPC from a learner node. One or more random indices are generated at 1004 based on the random seed. Negative examples are determined at 1006 based on the word indices and the random indices. Partial input and output vectors are determined and located at 1008 based on the word indices. Partial output vectors for the negative example words are determined and located at 1010.

Partial dot products are calculated and sent to the learner node at 1012. At 1014, linear combination weights, word indices, and the random seed are received from the learner node, in another RPC. At 1016, negative examples are regenerated based on the same seed. Partial vectors are retrieved again at 1018 for the target words, the positive words, and the negative examples. At 1020, updated partial vectors are calculated based on the partial vectors and the linear combination weights.

Figure 11:
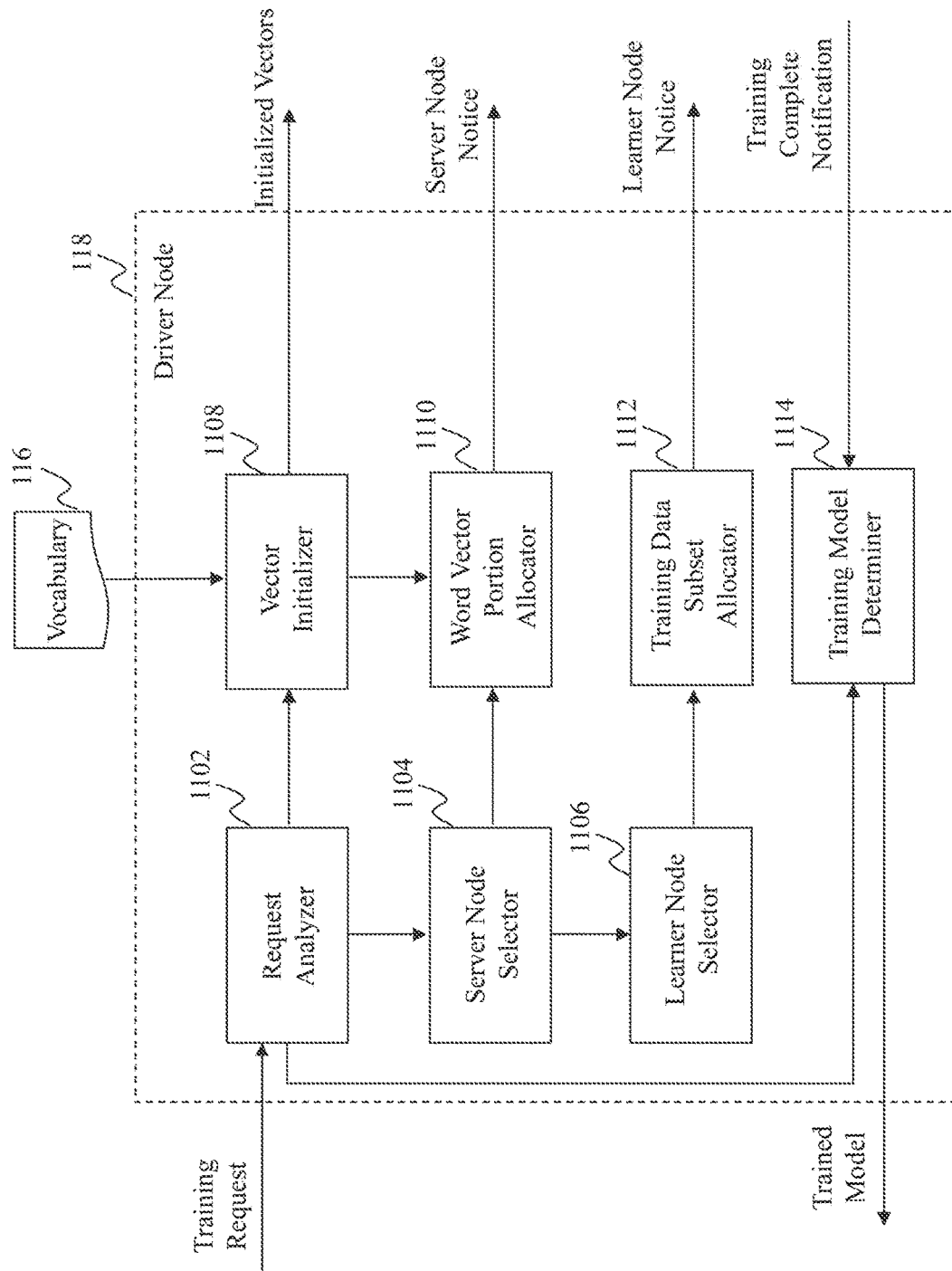
FIG. 11 illustrates an exemplary diagram of a driver node, according to an embodiment of the present teaching.

FIG. 11 illustrates an exemplary diagram of a driver node 118 in a cluster, according to an embodiment of the present teaching. The driver node 118 in this example includes a request analyzer 1102, a server node selector 1104, a learner node selector 1106, a vector initializer 1108, a word vector portion allocator 1110, a training data subset allocator 1112, and a training model determiner 1114.

The request analyzer 1102 in this example may receive a request for training a model from a user, e.g. a Word2Vec model for query/ad matching. The request analyzer 1102 may analyze the request and determine a type of the request. The request analyzer 1102 may send information about the request to the server node selector 1104 for selecting server nodes for training the model. The request analyzer 1102 may also send information about the request to the vector initializer 1108 for initializing the vectors for training the model. The request analyzer 1102 may also send information about the request to the training model determiner 1114 for finalizing the model and informing the requester about the finalized model.

The server node selector 1104 in this example may select one or more server nodes in the same cluster for training the model, based on information received from the request analyzer 1102. The server node selector 1104 may send IDs of the selected server nodes to the word vector portion allocator 1110 for allocating partial vectors. The server node selector 1104 may also send IDs of the selected server nodes and information about the request to the learner node selector 1106 for selecting one or more learner nodes.

The learner node selector 1106 in this example may select one or more learner nodes in the same cluster for training the model, based on information received from the server node selector 1104. The learner node selector 1106 may send IDs of the selected learner nodes to the training data subset allocator 1112 for allocating training data subsets.

The vector initializer 1108 in this example may determine an initialized vector for each word in the vocabulary 116. In one example, the vector initializer 1108 may randomly initialize each input vector and set each output vector to all zeros. In another embodiment, the initialization of the vectors can be performed at the server nodes after they are selected and allocated with corresponding partial vectors. The vector initializer 1108 may send the initialized vectors to the word vector portion allocator 1110 for allocating partial vectors. In one embodiment, the vector initializer 1108 may send the initialized vectors to in-memory vector storage in each of the selected server nodes.

The word vector portion allocator 1110 in this example may column-wise divide the vectors of the words in the vocabulary and allocate different word vector portions to different selected server nodes. For example, a server node may be allocated columns 1 to 20 of each vector; and another server node may be allocated columns 21 to 40 of each vector; and so on. The word vector portion allocator 1110 may generate and send a server node notice to each selected server node, to inform the server node about the model training and its allocated vector portions.

The training data subset allocator 1112 in this example may divide the training data into multiple subsets and allocate each subset to one of the selected learner nodes, such that each learner node is responsible for training the model based on the subset of training data. The training data subset allocator 1112 may generate and send a learner node notice to each selected learner node, to inform the learner node about the model training and its allocated training data subset.

The training model determiner 1114 in this example may determine or finalize a model trained in the cluster, e.g. after receiving a training complete notification from each learner node. In response to the request received at the request analyzer 1102, the training model determiner 1114 may send the trained model to the requester. In various embodiments, the trained model may be utilized for many implementations involving natural language processing, e.g. query/ad matching at a search engine.

Figure 12:
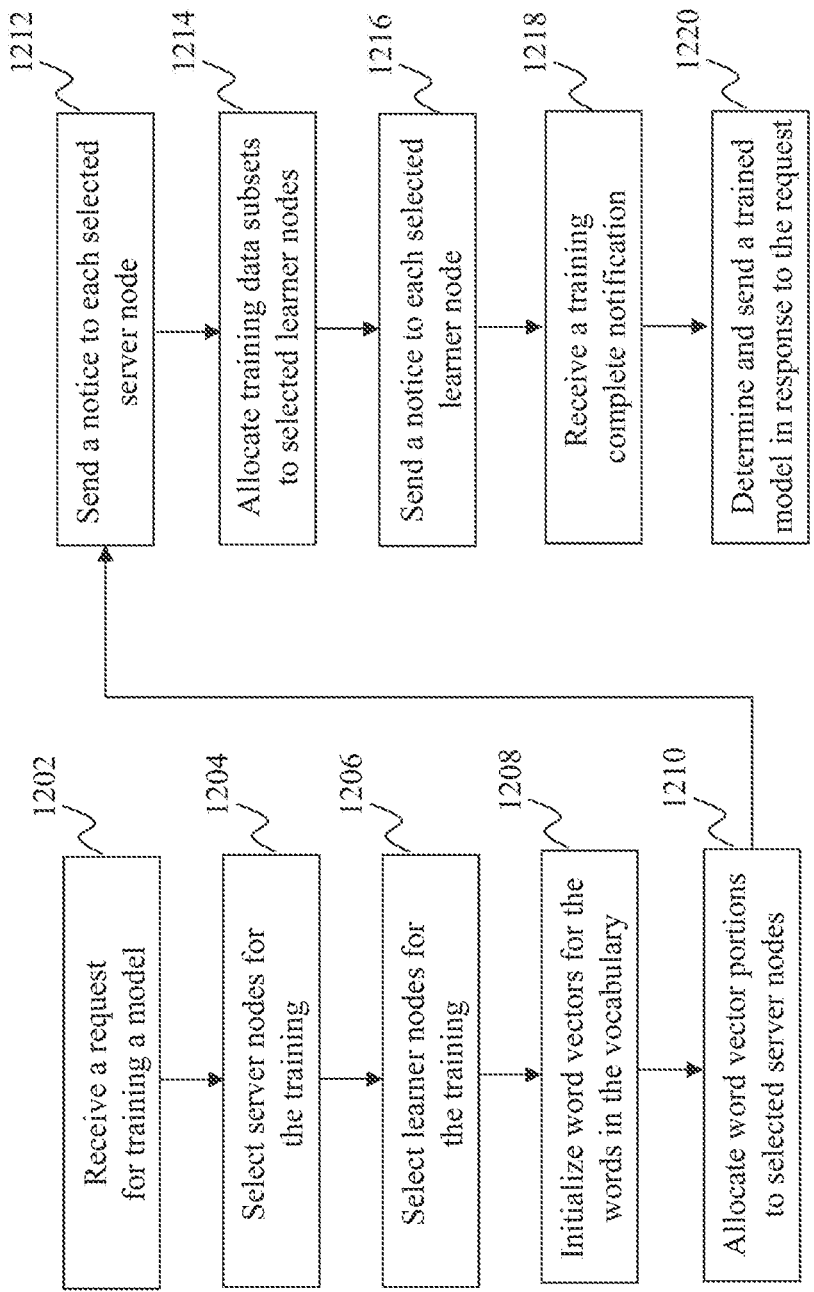
FIG. 12 is a flowchart of an exemplary process performed by a driver node, according to an embodiment of the present teaching.

FIG. 12 is a flowchart of an exemplary process performed by a driver node, e.g. the driver node 118 in FIG. 11, according to an embodiment of the present teaching. A request is received at 1202 for training a model, e.g. a Word2Vec model, on a cluster including a plurality of nodes. One or more server nodes are selected at 1204 from the cluster for the training. One or more learner nodes are selected at 1206 from the cluster for the training. Word vectors are initialized at 1208 for the words in the vocabulary. Different portions of the word vectors are allocated at 1210 to different selected server nodes.

A notice is generated and sent at 1212 to each selected server node, with information about the word vector portion allocation. Different training data subsets are allocated at 1214 to different selected learner nodes. A notice is generated and sent at 1216 to each selected learner node, with information about the training data subset allocation. A training complete notification is received at 1218. Then at 1220, a trained model is determined and sent in response to the request.

It can be understood that the orders of the steps in FIG. 8, FIG. 10, and FIG. 12 may be changed according to different embodiments of the present teaching.

Figure 15:
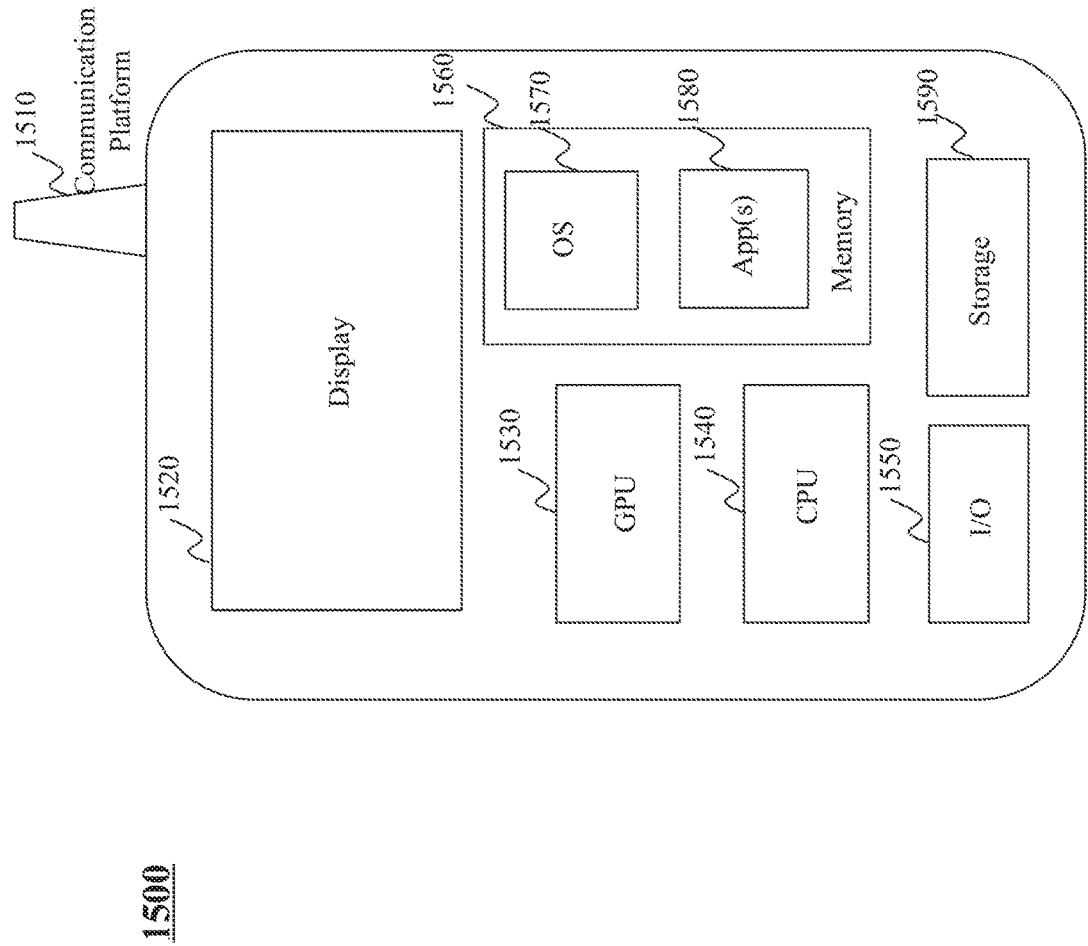
FIG. 15 depicts the architecture of a mobile device which can be used to implement a specialized system incorporating the present teaching.

FIG. 15 depicts the architecture of a mobile device which can be used to realize a specialized system implementing the present teaching. In this example, the driver node, the learner node or the server node is a mobile device 1500, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1500 in this example includes one or more central processing units (CPUs) 1540, one or more graphic processing units (GPUs) 1530, a display 1520, a memory 1560, a communication platform 1510, such as a wireless communication module, storage 1590, and one or more input/output (I/O) devices 1550. Any other suitable component, including but not limited to a system bus or a controller (not shown), may also be included in the mobile device 1500. As shown in FIG. 15, a mobile operating system 1570, e.g., iOS, Android, Windows Phone, etc., and one or more applications 1580 may be loaded into the memory 1560 from the storage 1590 in order to be executed by the CPU 1540. The applications 1580 may include a browser or any other suitable mobile apps for distributed machine learning on the mobile device 1500. User interactions with the device 1500 may be achieved via the I/O devices 1550.

To implement various modules, units, and their functionalities described in the present disclosure, computer hardware platforms may be used as the hardware platform(s) for one or more of the elements described herein (e.g., the learner node 114-1, the server node 115-1, the driver node 118, and/or other components of the systems 100 and 200 described with respect to FIGS. 1-14). The hardware elements, operating systems and programming languages of such computers are conventional in nature, and it is presumed that those skilled in the art are adequately familiar therewith to adapt those technologies to distributed machine learning as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 16:
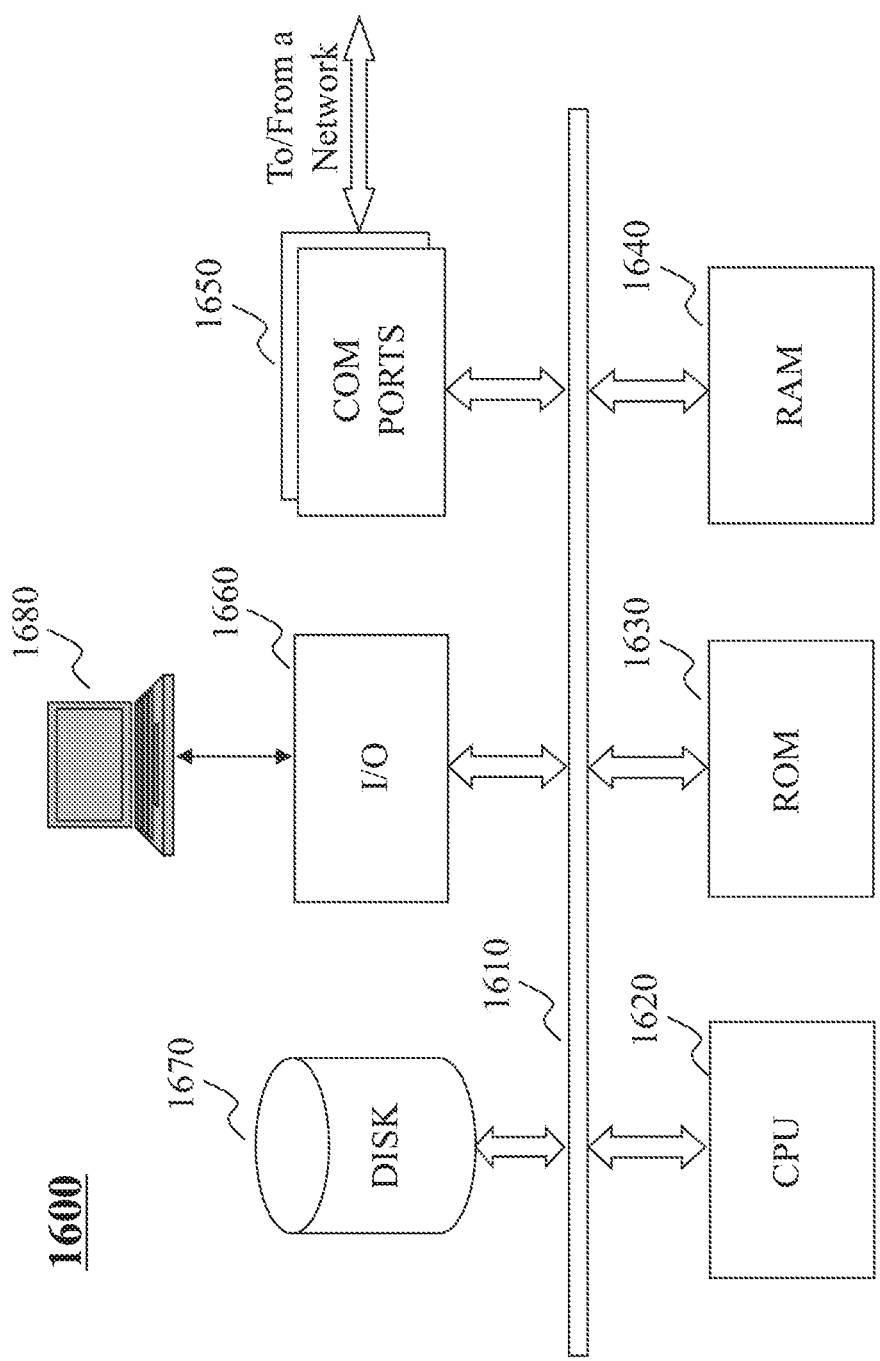
FIG. 16 depicts the architecture of a computer which can be used to implement a specialized system incorporating the present teaching.

FIG. 16 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1600 may be used to implement any component of the distributed machine learning techniques, as described herein. For example, the learner node 114-1, the server node 115-1, the driver node 118, etc., may be implemented on a computer such as computer 1600, via its hardware, software program, firmware, or a combination thereof. Although only one such computer is shown, for convenience, the computer functions relating to distributed machine learning as described herein may be implemented in a distributed fashion on a number of similar platforms, to distribute the processing load.

The computer 1600, for example, includes COM ports 1650 connected to and from a network connected thereto to facilitate data communications. The computer 1600 also includes a central processing unit (CPU) 1620, in the form of one or more processors, for executing program instructions. The exemplary computer platform includes an internal communication bus 1610, program storage and data storage of different forms, e.g., disk 1670, read only memory (ROM) 1630, or random access memory (RAM) 1640, for various data files to be processed and/or communicated by the computer, as well as possibly program instructions to be executed by the CPU. The computer 1600 also includes an I/O component 1660, supporting input/output flows between the computer and other components therein such as user interface elements 1680. The computer 1600 may also receive programming and data via network communications. In various embodiments, the computer 1600 may be a laptop, a desktop, a work station, a server or any other form of a computer including the components in FIG. 16.

Hence, aspects of the methods of distributed machine learning, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from one device into the hardware platform(s) of a computing environment or other system implementing a computing environment or similar functionalities in connection with distributed machine learning techniques. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the distributed machine learning as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A system including a plurality of nodes, each of which has at least one processor, storage, and a communication platform connected to a network for training a machine learning model, the system comprising:
 a plurality of server nodes, each of which is communicatively coupled with a plurality of learner nodes; and
 a driver node configured for
  receiving a request for training a model,
  generating a plurality of sub-vectors, each of which is a portion of a feature vector associated with a word in a group of words,
  allocating different sub-vectors associated with the word to different server nodes,
  partitioning training data into a plurality of training data subsets, each of which is allocated to a learner node,
  receiving a notification indicating completion of training the model, and
  transmitting the model in response to the request.

2. The system of claim 1, wherein each of the plurality of learner nodes is configured for generating information related to a group of words, wherein the information is indicative of a center word and relationship thereof with other words in the group of words.

3. The system of claim 2, wherein the information related to the group of words includes a first index for the center word, and a second set of one or more indices for one or more positive context words of the center word.

4. The system of claim 3, wherein:
 the information related to the group of words further includes a random seed; and
 each of the plurality of server nodes is further configured for generating, based on the random seed and the first index, a third set of one or more indices for one or more negative words that are not semantically related to the center word.

5. The system of claim 1, wherein the driver node is further configured for:
 selecting, based on the request, the one or more learner nodes and the plurality of server nodes for training the model; and
 initializing at least some feature vectors in the plurality of feature vectors with random numbers.

6. The system of claim 1, wherein each of the plurality of server nodes is further configured for:
 calculating a plurality of partial dot products each of which is a dot product of two sub-vectors; and
 providing the plurality of partial dot products to the plurality of learner nodes.

7. The system of claim 1, wherein:
 the model is utilized to determine one or more advertisements based on a query; and
 the one or more advertisements are to be provided in response to the query.

8. A method implemented on at least one computing device each of which has at least one processor, storage, and a communication platform connected to a network for training a machine learning model, the method comprising:
 receiving a request for training a model;
 generating a plurality of sub-vectors, each of which is a portion of a feature vector associated with a word in a group of words;
 allocating different sub-vectors associated with the word to different server nodes of a plurality of server nodes;
 partitioning training data into a plurality of training data subsets, each of which is allocated to a learner node of a plurality of learner nodes, wherein each server node is communicatively coupled with the plurality of learner nodes;
 receiving a notification indicating completion of training the model; and
 transmitting the model in response to the request.

9. The method of claim 8, wherein each of the plurality of learner nodes is configured for generating information related to a group of words, wherein the information is indicative of a center word and relationship thereof with other words in the group of words.

10. The method of claim 9, wherein the information related to the group of words includes a first index for the center word, and a second set of one or more indices for one or more positive context words of the center word.

11. The method of claim 10, wherein:
 the information related to the group of words further includes a random seed; and
 each of the plurality of server nodes is further configured for generating, based on the random seed and the first index, a third set of one or more indices for one or more negative words that are not semantically related to the center word.

12. The method of claim 8, further comprising:
 selecting, based on the request, the one or more learner nodes and the plurality of server nodes for training the model; and
 initializing at least some feature vectors in the plurality of feature vectors with random numbers.

13. The method of claim 8, further comprising:
 calculating a plurality of partial dot products each of which is a dot product of two sub-vectors; and
 providing the plurality of partial dot products to the plurality of learner nodes.

14. The method of claim 8, wherein:
 the model is utilized to determine one or more advertisements based on a query; and
 the one or more advertisements are to be provided in response to the query.

15. A machine-readable tangible and non-transitory medium having information for training a machine learning model, wherein the information, when read by the machine, causes the machine to perform the following:
 receiving a request for training a model;
 generating a plurality of sub-vectors, each of which is a portion of a feature vector associated with a word in a group of words;
 allocating different sub-vectors associated with the word to different server nodes of a plurality of server nodes;
 partitioning training data into a plurality of training data subsets, each of which is allocated to a learner node of a plurality of learner nodes, wherein each server node is communicatively coupled with the plurality of learner nodes;
 receiving a notification indicating completion of training the model; and
 transmitting the model in response to the request.

16. The medium of claim 15, wherein each of the plurality of learner nodes is configured for generating information related to a group of words, wherein the information is indicative of a center word and relationship thereof with other words in the group of words.

17. The medium of claim 16, wherein the information related to the group of words includes a first index for the center word, and a second set of one or more indices for one or more positive context words of the center word.

18. The medium of claim 17, wherein:

the information related to the group of words further includes a random seed; and each of the plurality of server nodes is further configured for generating, based on the random seed and the first index, a third set of one or more indices for one or more negative words that are not semantically related to the center word.

19. The medium of claim 15, further comprising:

selecting, based on the request, the one or more learner nodes and the plurality of server nodes for training the model; and initializing at least some feature vectors in the plurality of feature vectors with random numbers.

20. The medium of claim 15, wherein:

the model is utilized to determine one or more advertisements based on a query; and the one or more advertisements are to be provided in response to the query.

* * * * *